(12) United States Patent
Tokimune et al.

(10) Patent No.: US 9,284,433 B2
(45) Date of Patent: Mar. 15, 2016

(54) RUBBER COMPOSITION AND PNEUMATIC TIRE

(75) Inventors: Ryuichi Tokimune, Kobe (JP); Yuko Hinohara, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/126,746

(22) PCT Filed: May 24, 2012

(86) PCT No.: PCT/JP2012/063292
§ 371 (c)(1),
(2), (4) Date: Dec. 16, 2013

(87) PCT Pub. No.: WO2013/018424
PCT Pub. Date: Feb. 7, 2013

(65) Prior Publication Data
US 2014/0114014 A1   Apr. 24, 2014

(30) Foreign Application Priority Data

Aug. 3, 2011   (JP) .................. 2011-170556

(51) Int. Cl.
*C08K 3/36* (2006.01)
*B60C 1/00* (2006.01)
*C08C 19/44* (2006.01)

(52) U.S. Cl.
CPC .................. *C08K 3/36* (2013.01); *B60C 1/0016* (2013.04); *C08C 19/44* (2013.01); *Y02T 10/862* (2013.01)

(58) Field of Classification Search
CPC .............................. C08K 3/36; B60C 1/0016
USPC ........................ 524/492, 493, 547; 526/279
See application file for complete search history.

(56) References Cited

U.S. PATENT DOCUMENTS

| | | | |
|---|---|---|---|
| 4,929,679 A | 5/1990 | Akita et al. | |
| 4,945,964 A | 8/1990 | Takiguchi et al. | |
| 5,189,109 A | 2/1993 | Imai et al. | |
| 5,574,109 A | 11/1996 | Lawson et al. | |
| 5,679,744 A | 10/1997 | Kawauzra et al. | |
| 5,834,552 A | 11/1998 | Kawazura et al. | |
| 5,902,856 A | 5/1999 | Suzuki et al. | |
| 5,932,662 A | 8/1999 | Lawson et al. | |
| 5,932,866 A | 8/1999 | Terada et al. | |
| 7,084,228 B2 | 8/2006 | Labauze et al. | |
| 7,351,761 B2 | 4/2008 | Hochi | |
| 2004/0152845 A1 | 8/2004 | Oshima et al. | |
| 2005/0209413 A1 | 9/2005 | Labauze et al. | |
| 2006/0173118 A1 | 8/2006 | Hochi et al. | |
| 2007/0149688 A1 | 6/2007 | Hochi | |
| 2008/0289740 A1 | 11/2008 | Mori et al. | |
| 2009/0247696 A1* | 10/2009 | Fujii et al. | 524/572 |
| 2010/0048806 A1 | 2/2010 | Inagaki et al. | |
| 2010/0056703 A1 | 3/2010 | Oshima | |
| 2010/0056709 A1 | 3/2010 | Oshima | |
| 2010/0056710 A1 | 3/2010 | Oshima | |
| 2010/0056712 A1 | 3/2010 | Oshima | |
| 2010/0056713 A1 | 3/2010 | Oshima | |
| 2010/0144954 A1 | 6/2010 | Kikuchi et al. | |
| 2010/0184908 A1 | 7/2010 | Kikuchi et al. | |
| 2011/0166254 A1 | 7/2011 | Nishimura | |
| 2011/0237737 A1 | 9/2011 | Fujii et al. | |
| 2011/0245398 A1 | 10/2011 | Hama et al. | |
| 2012/0190771 A1 | 7/2012 | Ito et al. | |
| 2012/0283354 A1 | 11/2012 | Hattori et al. | |
| 2013/0085225 A1 | 4/2013 | Nishioka et al. | |
| 2014/0114014 A1 | 4/2014 | Tokimune et al. | |
| 2014/0213693 A1* | 7/2014 | Mabuchi et al. | 523/156 |
| 2014/0213714 A1* | 7/2014 | Ono et al. | 524/492 |
| 2014/0228501 A1* | 8/2014 | Ono et al. | 524/493 |
| 2014/0256847 A1* | 9/2014 | Sato et al. | 523/156 |
| 2014/0275430 A1* | 9/2014 | Ishino et al. | 525/326.5 |
| 2014/0296376 A1* | 10/2014 | Sato et al. | 523/156 |

(Continued)

FOREIGN PATENT DOCUMENTS

| | | |
|---|---|---|
| CN | 1134434 A | 10/1996 |
| CN | 1148606 A | 4/1997 |

(Continued)

*Primary Examiner* — Vickey Nerangis
(74) *Attorney, Agent, or Firm* — Birch, Stewart, Kolasch & Birch, LLP

(57) ABSTRACT

The present invention provides a rubber composition that enables to improve the fuel economy, wet-grip performance, abrasion resistance, and processability in a balanced manner, and a pneumatic tire including the rubber composition. The present invention relates to a rubber composition containing silica and a conjugated diene polymer, the conjugated diene polymer being obtained by reacting a compound containing a nitrogen atom and/or a silicon atom with an active end of a copolymer obtained by polymerizing a monomer component including a conjugated diene compound and a silicon-containing vinyl compound using a polymerization initiator represented by the following formula (I):

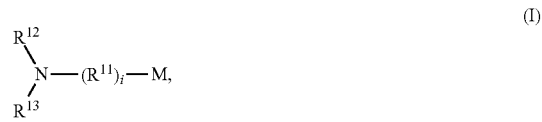

wherein an amount of the conjugated diene polymer is not more than 90% by mass based on 100% by mass of a rubber component of the rubber composition, and an amount of the silica is 10 to 150 parts by mass per 100 parts by mass of the rubber component.

6 Claims, No Drawings

(56) References Cited

U.S. PATENT DOCUMENTS

2014/0329930 A1* 11/2014 Sato .................. 523/156
2014/0329931 A1* 11/2014 Sato .................. 523/156

FOREIGN PATENT DOCUMENTS

| | | | |
|---|---|---|---|
| CN | 1386786 A | 12/2002 |
| CN | 1530379 A | 9/2004 |
| CN | 1821293 A | 8/2006 |
| CN | 1990532 A | 7/2007 |
| CN | 101113217 A | 1/2008 |
| CN | 101659729 A | 3/2010 |
| CN | 101659731 A | 3/2010 |
| CN | 101671418 A | 3/2010 |
| CN | 102093602 A | 6/2011 |
| CN | 102093605 A | 6/2011 |
| CN | 102108141 A | 6/2011 |
| CN | 102603975 A | 7/2012 |
| CN | 103003346 A | 3/2013 |
| EP | 0 585 012 A1 | 3/1994 |
| EP | 0 881 101 A1 | 12/1998 |
| EP | 1 484 362 A1 | 12/2004 |
| EP | 1 803 770 A2 | 7/2007 |
| EP | 1 925 636 A1 | 5/2008 |
| EP | 2 196 324 A1 | 6/2010 |
| EP | 2 223 959 A1 | 9/2010 |
| EP | 2 236 554 A1 | 10/2010 |
| EP | 2 329 964 A1 | 6/2011 |
| EP | 2 338 698 A1 | 6/2011 |
| EP | 2 338 919 A1 | 6/2011 |
| EP | 2 366 557 A1 | 9/2011 |
| EP | 2 366 558 A1 | 9/2011 |
| EP | 2 404 944 A1 | 1/2012 |
| JP | 48-17674 B1 | 5/1973 |
| JP | 56-131640 A | 10/1981 |
| JP | 63-99249 A | 4/1988 |
| JP | 63-99252 A | 4/1988 |
| JP | 8-193147 A | 7/1996 |
| JP | 8-231766 A | 9/1996 |
| JP | 8-253520 A | 10/1996 |
| JP | 2000-239444 A | 9/2000 |
| JP | 2000-344955 A | 12/2000 |
| JP | 2001-151940 A | 6/2001 |
| JP | 2004-137463 A | 5/2004 |
| JP | 2004-277696 A | 10/2004 |
| JP | 2004-331940 A | 11/2004 |
| JP | 2006-182940 A | 7/2006 |
| JP | 2006-233177 A | 9/2006 |
| JP | 2006-257260 A | 9/2006 |
| JP | 2007-197671 A | 8/2007 |
| JP | 2008-101158 A | 5/2008 |
| JP | 2009-1721 A | 1/2009 |
| JP | 2009-35643 A | 2/2009 |
| JP | 2010-77412 A | 4/2010 |
| JP | 2010-77413 A | 4/2010 |
| JP | 2010-77414 A | 4/2010 |
| JP | 2010-254852 A | 11/2010 |
| JP | 2011-79913 A | 4/2011 |
| JP | 2011-144324 A | 7/2011 |
| JP | 2012-167257 A | 9/2012 |
| WO | WO 2009/048006 A1 | 4/2009 |
| WO | WO 2010/116988 A1 | 10/2010 |
| WO | WO 2011/087004 A1 | 7/2011 |
| WO | WO 2012/011571 A1 | 1/2012 |

* cited by examiner

RUBBER COMPOSITION AND PNEUMATIC TIRE

TECHNICAL FIELD

The present invention relates to a rubber composition and a pneumatic tire formed from the rubber composition.

BACKGROUND ART

With the increase in concern about environmental issues, the demands on automobiles for better fuel economy have been increasing in recent years. Better fuel economy is also being required of rubber compositions used for automotive tires. For example, rubber compositions containing a conjugated diene polymer (e.g., polybutadiene, butadiene-styrene copolymer) and a filler (e.g., carbon black, silica) are used for automotive tires.

An example of a method for improving the fuel economy is proposed in Patent Literature 1; this method uses a diene rubber (modified rubber) that is modified by an organosilicon compound containing an amino group and an alkoxy group. Although the use of a modified rubber improves the fuel economy, it also tends to increase the Mooney viscosity to thereby deteriorate the processability. Moreover, wet-grip performance and abrasion resistance, which are also properties required of rubber compositions used for automotive tires, generally assume an inverse relationship with fuel economy. Thus, it has been difficult to achieve these properties at high levels in a balanced manner.

CITATION LIST

Patent Literature

Patent Literature 1: JP 2000-344955 A

SUMMARY OF THE INVENTION

Technical Problem

The present invention aims to solve the problems identified above and provide a rubber composition that enables to improve the fuel economy, wet-grip performance, abrasion resistance, and processability in a balanced manner, and a pneumatic tire including the rubber composition.

Solution to Problem

The present invention relates to a rubber composition, comprising silica and a conjugated diene polymer, the conjugated diene polymer being obtained by reacting a compound containing at least one of a nitrogen atom and a silicon atom with an active end of a copolymer obtained by polymerizing a monomer component including a conjugated diene compound and a silicon-containing vinyl compound using a polymerization initiator represented by the following formula (I):

[Chem. 1]

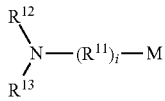
(I)

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ can be joined together to represent a hydrocarbylene group optionally containing at least one atom, as a hetero atom, selected from the group consisting of a silicon atom, a nitrogen atom, and an oxygen atom; and M represents an alkali metal atom, wherein an amount of the conjugated diene polymer is not more than 90% by mass based on 100% by mass of a rubber component of the rubber composition, and an amount of the silica is 10 to 150 parts by mass per 100 parts by mass of the rubber component.

$R^{11}$ in the formula (I) is preferably a group represented by the following formula (Ia):

[Chem. 2]

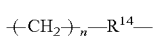
(Ia)

wherein $R^{14}$ represents a hydrocarbylene group comprising at least one of a conjugated diene compound-derived structural unit and an aromatic vinyl compound-derived structural unit; and n represents an integer of 1 to 10.

$R^{14}$ in the formula (Ia) is preferably a hydrocarbylene group having one to ten isoprene-derived structural units.

The silicon-containing vinyl compound is preferably a compound represented by the following formula (II):

[Chem. 3]

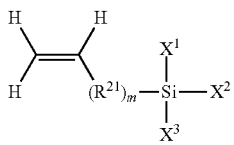
(II)

wherein m represents 0 or 1; $R^{21}$ represents a hydrocarbylene group; and $X^1$, $X^2$ and $X^3$ each represent a substituted amino group, a hydrocarbyloxy group, or an optionally substituted hydrocarbyl group.

The conjugated diene polymer preferably comprises an aromatic vinyl compound-derived structural unit.

The silica preferably has a nitrogen adsorption specific surface area of 40 to 400 $m^2/g$.

The present invention also relates to a pneumatic tire, formed from the aforementioned rubber composition.

Advantageous Effects of Invention

The rubber composition of the present invention contains a specified amount of a specific conjugated diene polymer and a specified amount of silica, and thus it enables to provide a pneumatic tire having improved fuel economy, wet-grip performance, abrasion resistance, and processability in a balanced manner.

DESCRIPTION OF EMBODIMENTS

As used herein, the hydrocarbyl group denotes a monovalent group provided by removing one hydrogen atom from a hydrocarbon; the hydrocarbylene group denotes a divalent group provided by removing two hydrogen atoms from a hydrocarbon; the hydrocarbyloxy group denotes a monovalent group provided by substituting the hydrogen atom of a hydroxy group with a hydrocarbyl group; the substituted amino group denotes a group provided by substituting at least one hydrogen atom of an amino group with a monovalent atom other than hydrogen or with a monovalent group, or denotes a group provided by substituting two hydrogen atoms of an amino group with a divalent group; the hydrocarbyl group having a substituent (hereinafter, also referred to as substituted hydrocarbyl group) denotes a monovalent group provided by substituting at least one hydrogen atom of a hydrocarbyl group with a substituent group; and the hydrocarbylene group containing a hetero atom (hereinafter, also referred to as hetero atom-containing hydrocarbylene group) denotes a divalent group provided by substituting a hydrogen atom and/or a carbon atom other than the carbon atoms from which a hydrogen atom has been removed in a hydrocarbylene group with a group containing a hetero atom (an atom other than carbon and hydrogen atoms).

The conjugated diene polymer in the present invention is obtained by reacting a compound containing a nitrogen atom and/or a silicon atom with an active end of a copolymer obtained by polymerizing a monomer component including a conjugated diene compound and a silicon-containing vinyl compound using a polymerization initiator represented by the following formula (I):

[Chem. 4]

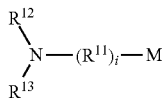
(I)

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ can be joined together to represent a hydrocarbylene group optionally containing at least one atom, as a hetero atom, selected from the group consisting of a silicon atom, a nitrogen atom, and an oxygen atom; and M represents an alkali metal atom.

As used herein, the term "modifying" means bonding a copolymer containing a diene compound, or a copolymer containing a diene compound and an aromatic vinyl compound, to a compound other than the compound(s). The above conjugated diene polymer has a structure in which a polymerization initiation end is modified by the polymerization initiator represented by the formula (I); a main chain is modified by copolymerization with a silicon-containing vinyl compound; and a termination end is modified by a compound containing a nitrogen atom and/or a silicon atom a silicon-containing vinyl compound. Use of the conjugated diene polymer in combination with other rubbers in the rubber component enables to disperse silica well and improve the fuel economy, wet-grip performance, and abrasion resistance in a balanced manner. In general, use of a modified rubber in which all of an initiation end, a main chain and a termination end are modified tends to greatly deteriorate the processability. In contrast, use of the conjugated diene polymer in which an initiation end, a main chain and a termination end are respectively modified by specific compounds enables to ensure good processability, and furthermore, enables to increase the effects of improving the fuel economy, wet-grip performance, and abrasion resistance. Thus, the fuel economy, wet-grip performance, abrasion resistance, and processability are improved at high levels in a balanced manner.

In the formula (I), i is 0 or 1, and preferably 1.

$R^{11}$ in the formula (I) is a $C_{1-100}$ hydrocarbylene group, preferably a $C_{6-100}$ hydrocarbylene group, and more preferably a $C_{7-80}$ hydrocarbylene group. If the $R^{11}$ has more than 100 carbon atoms, the polymerization initiator has an increased molecular weight which may reduce the cost efficiency and the handleability in the polymerization.

Plural kinds of compounds differing in the carbon number of $R^{11}$ may be used in combination as the polymerization initiator represented by the formula (I).

$R^{11}$ in the formula (I) is preferably a group represented by the following formula (Ia):

[Chem. 5]

(Ia)

wherein $R^{14}$ represents a hydrocarbylene group containing a conjugated diene compound-derived structural unit and/or an aromatic vinyl compound-derived structural unit; and n represents an integer of 1 to 10.

$R^{14}$ in the formula (Ia) represents a hydrocarbylene group containing a conjugated diene compound-derived structural unit and/or an aromatic vinyl compound-derived structural unit, preferably a hydrocarbylene group containing an isoprene-derived structural unit, and more preferably a hydrocarbylene group having one to ten isoprene-derived structural units.

The number of the conjugated diene compound-derived structural unit and/or the aromatic vinyl compound-derived structural unit in $R^{14}$ is preferably one to ten, and more preferably one to five units.

In the formula (Ia), n is an integer of 1 to 10, and preferably an integer of 2 to 4.

The group of $R^{11}$ may be a group in which a methylene group is linked to one to ten isoprene-derived structural units, a group in which an ethylene group is linked to one to ten isoprene-derived structural units, or a group in which a trimethylene group is linked to one to ten isoprene-derived structural units, and preferably a group in which a trimethylene group is linked to one to ten isoprene-derived structural units.

$R^{12}$ and $R^{13}$ in the formula (I) each represent an optionally substituted hydrocarbyl group or a trihydrocarbylsilyl group, or $R^{12}$ and $R^{13}$ can be joined together to represent a hydrocarbylene group optionally containing at least one atom, as a hetero atom, selected from the group consisting of a silicon atom, a nitrogen atom, and an oxygen atom.

The optionally substituted hydrocarbyl group refers to either a hydrocarbyl group or substituted hydrocarbyl group. The substituent in the substituted hydrocarbyl group may be a substituted amino group or a hydrocarbyloxy group. Examples of hydrocarbyl groups include acyclic alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-octyl group, and an n-dodecyl group; cyclic alkyl groups such as a cyclopentyl group and a cyclohexyl group; and aryl groups such as a phenyl group and a benzyl group, and preferably acyclic alkyl groups, and more preferably acyclic alkyl groups having 1 to 4 carbon atoms. The substituted hydrocarbyl group whose substituent is a substituted amino group may be an N,N-dimethylaminomethyl group, a 2-N,N-dimethylaminoethyl group, or a 3-N,N-dimethylaminopropyl group. The substituted hydrocarbyl group whose substituent is a hydrocarbyloxy group may be a methoxymethyl group, a methoxyethyl group, or an ethoxymethyl group. Among the above examples, hydrocarbyl groups are preferred; acyclic alkyl groups having 1 to 4 carbon atoms are more preferred; and a methyl group or an ethyl group is still more preferred.

The trihydrocarbylsilyl group may be a trimethylsilyl group or a tert-butyl-dimethylsilyl group, and preferably a trimethylsilyl group.

The hydrocarbylene group optionally containing at least one atom, as a hetero atom, selected from the group consisting of a silicon atom, a nitrogen atom and an oxygen atom refers to either a hydrocarbylene group, or a hetero atom-containing hydrocarbylene group in which the hetero atom is at least one selected from the group consisting of a silicon atom, a nitrogen atom and an oxygen atom. The hetero atom-containing hydrocarbylene group in which the hetero atom is at least one selected from the group consisting of a silicon atom, a nitrogen atom and an oxygen atom may be a hetero atom-containing hydrocarbylene group in which the hetero atom is a silicon atom, a hetero atom-containing hydrocarbylene group in which the hetero atom is a nitrogen atom, or a hetero atom-containing hydrocarbylene group in which the hetero atom is an oxygen atom. Examples of hydrocarbylene groups include alkylene groups such as a tetramethylene group, a pentamethylene group, a hexamethylene group, a pent-2-ene-1,5-diyl group, and a 2,2,4-trimethylhexane-1,6-diyl group; and alkenediyl groups such as a pent-2-ene-1,5-diyl group, and preferably alkylene groups, and more preferably alkylene groups having 4 to 7 carbon atoms. The hetero atom-containing hydrocarbylene group in which the hetero atom is a silicon atom may be a group represented by —Si(CH$_3$)$_2$—CH$_2$—CH$_2$—Si(CH$_3$)$_2$—. The hetero atom-containing hydrocarbylene group in which the hetero atom is a nitrogen atom may be a group represented by —CH=N—CH=CH— or a group represented by —CH=N—CH$_2$—CH$_2$—. The hetero atom-containing hydrocarbylene group in which the hetero atom is an oxygen atom may be a group represented by —CH$_2$—CH$_2$—O—CH$_2$—CH$_2$—. Among the above examples, hydrocarbylene groups are preferred; alkylene groups having 4 to 7 carbon atoms are more preferred; and a tetramethylene group, a pentamethylene group, and a hexamethylene group are still more preferred.

Preferably, $R^{12}$ and $R^{13}$ each are a hydrocarbyl group, or $R^{12}$ and $R^{13}$ are joined together to form a hydrocarbylene group. More preferably, $R^{12}$ and $R^{13}$ each are an acyclic alkyl group having 1 to 4 carbon atoms, or $R^{12}$ and $R^{13}$ are joined together to form an alkylene group having 4 to 7 carbon atoms. Still more preferably, $R^{12}$ and $R^{13}$ each are a methyl group or an ethyl group.

M in the formula (I) represents an alkali metal atom. Examples of alkali metal atoms include Li, Na, K, and Cs, and preferably Li.

The polymerization initiator represented by the formula (I) in which i is 1 may be a compound formed from an aminoalkyllithium compound and one to five isoprene-derived structural units polymerized. Examples of the aminoalkyllithium compound include N,N-dialkylaminoalkyllithiums such as 3-(N,N-dimethylamino)-1-propyllithium, 3-(N,N-diethylamino)-1-propyllithium, 3-(N,N-di-n-butylamino)-1-propyllithium, 4-(N,N-dimethylamino)-1-butyllithium, 4-(N,N-diethylamino)-1-butyllithium, 4-(N,N-di-n-propylamino)-1-butyllithium, and 3-(N,N-di-n-butylamino)-1-butyllithium; non-hetero atom-containing cyclic aminoalkyllithium compounds such as 3-(1-pyrrolidino)-1-propyllithium, 3-(1-piperidino)-1-propyllithium, 3-(1-hexamethyleneimino)-1-propyllithium, and 3-[1-(1,2,3,6-tetrahydropyridino)]-1-propyllithium; hetero atom-containing cyclic aminoalkyllithium compounds such as 3-(1-morpholino)-1-propyllithium, 3-(1-imidazolyl)-1-propyllithium, 3-(4,5-dihydro-1-imidazolyl)-1-propyllithium, and 3-(2,2,5,5-tetramethyl-1-aza-2,5-disila-1-cyclopentyl)-1-propyllithium, and preferably N,N-dialkylaminoalkyllithiums, and more preferably 3-(N,N-dimethylamino)-1-propyllithium or 3-(N,N-diethylamino)-1-propyllithium.

Examples of the polymerization initiator represented by the formula (I) in which i is 0 include lithium hexamethyleneimide, lithium pyrrolidide, lithium piperidide, lithium heptamethyleneimide, lithium dodecamethyleneimide, lithium dimethylamide, lithium diethylamide, lithium dipropylamide, lithium dibutylamide, lithium dihexylamide, lithium diheptylamide, lithium dioctylamide, lithium di-2-ethylhexylamide, lithium didecylamide, lithium-N-methylpiperadide, lithium ethylpropylamide, lithium ethylbutylamide, lithium methylbutylamide, lithium ethylbenzylamide, and lithium methylphenethylamide.

The polymerization initiator represented by the formula (I) in which i is 0 may be prepared in advance from a secondary amine and a hydrocarbyllithium compound before it is used in the polymerization reaction, or may be formed in the polymerization system. Examples of the secondary amine include dimethylamine, diethylamine, dibutylamine, dioctylamine, dicyclohexylamine, and diisobutylamine. Other examples thereof include cyclic amines such as azacycloheptane (i.e. hexamethyleneimine), 2-(2-ethylhexyl)pyrrolidine, 3-(2-propyl)pyrrolidine, 3,5-bis(2-ethylhexyl)piperidine, 4-phenylpiperidine, 7-decyl-1-azacyclotridecane, 3,3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1-azacycloheptadecane, 2-methyl-1-azacycloheptadec-9-ene, 3-isobutyl-1-azacyclododecane, 2-methyl-7-t-butyl-1-azacyclododecane, 5-nonyl-1-azacyclododecane, 8-(4-methylphenyl)-5-pentyl-3-azabicyclo[5.4.0]undecane, 1-butyl-6-azabicyclo[3.2.1]octane, 8-ethyl-3-azabicyclo[3.2.1]octane, 1-propyl-3-azabicyclo[3.2.2]nonane, 3-t-(butyl)-7-azabicyclo[4.3.0]nonane, and 1,5,5-trimethyl-3-azabicyclo[4.4.0]decane.

The polymerization initiator represented by the formula (I) is preferably the compound in which i is 1, more preferably a compound formed from an N,N-aminoalkyllithium and one to five isoprene-derived structural units polymerized, and still more preferably a compound formed from 3-(N,N-dimethylamino)-1-propyllithium or 3-(N,N-diethylamino)-1-propyllithium and one to five isoprene-derived structural units polymerized.

The amount of the polymerization initiator represented by the formula (I) to be used is preferably 0.01 to 15 mmol, more preferably 0.1 to 10 mmol, per 100 g of the monomer component used in the polymerization.

In the present invention, other polymerization initiators, such as n-butyllithium, may be used in combination, if necessary.

Examples of the conjugated diene compound include 1,3-butadiene, isoprene, 1,3-pentadiene, 2,3-dimethyl-1,3-butadiene, 1,3-hexadiene, and myrcene. These may be used alone or in combinations of two or more. In view of easy availability, the conjugated diene compound is preferably 1,3-butadiene or isoprene.

The silicon-containing vinyl compound is preferably a compound represented by the following formula (II):

[Chem. 6]

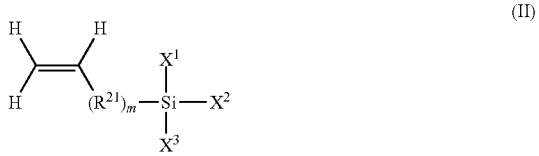

wherein m represents 0 or 1; $R^{21}$ represents a hydrocarbylene group; and $X^1$, $X^2$ and $X^3$ each represent a substituted amino group, a hydrocarbyloxy group, or an optionally substituted hydrocarbyl group.

In the formula (II), m is 0 or 1, and preferably 0.

Examples of hydrocarbylene groups that can be used in the formula (II) include alkylene groups, alkenediyl groups, arylene groups, and groups in which an arylene group and an alkylene group are bonded. Examples of alkylene groups include a methylene group, an ethylene group, and a trimethylene group. Examples of alkenediyl groups include a vinylene group and an ethylene-1,1-diyl group. Examples of arylene groups include a phenylene group, a naphthylene group, and a biphenylene group. Examples of groups in which an arylene group and an alkylene group are bonded include a group in which a phenylene group and a methylene group are bonded, and a group in which a phenylene group and an ethylene group are bonded.

$R^{21}$ is preferably an arylene group, and more preferably a phenylene group.

In the formula (II), $X^1$, $X^2$ and $X^3$ each represent a substituted amino group, a hydrocarbyloxy group, or an optionally substituted hydrocarbyl group. Preferably, at least one of $X^1$, $X^2$ and $X^3$ is a substituted amino group. More preferably, two of $X^1$, $X^2$ and $X^3$ are substituted amino groups.

In the formula (II), the substituted amino group is preferably a group represented by the following formula (IIa):

[Chem. 7]

wherein $R^{22}$ and $R^{23}$ each represent an optionally substituted hydrocarbyl group or a trihydrocarbylsilyl group, or $R^{22}$ and $R^{23}$ can be joined together to represent a hydrocarbylene group optionally containing, as a hetero atom, at least one of a nitrogen atom and an oxygen atom.

The optionally substituted hydrocarbyl group in the formula (IIa) refers to either a hydrocarbyl group or a substituted hydrocarbyl group. The substituted hydrocarbyl group may be a substituted hydrocarbyl group whose substituent is a hydrocarbyloxy group. Examples of hydrocarbyl groups include acyclic alkyl groups such as a methyl group, an ethyl group, an n-propyl group, an isopropyl group, an n-butyl group, an isobutyl group, a sec-butyl group, a tert-butyl group, an n-pentyl group, an n-hexyl group, and an n-octyl group; cyclic alkyl groups such as a cyclopentyl group and a cyclohexyl group; and aryl groups such as a phenyl group, a benzyl group, and a naphthyl group, and preferably acyclic alkyl groups, and more preferably a methyl group or an ethyl group. Examples of the substituted hydrocarbyl group whose substituent is a hydrocarbyloxy group include alkoxyalkyl groups such as a methoxymethyl group, an ethoxymethyl group, and a methoxyethyl group; and aryloxyalkyl groups such as a phenoxymethyl group.

Examples of the trihydrocarbylsilyl group in the formula (IIa) include trialkylsilyl groups such as a trimethylsilyl group, a triethylsilyl group, and a tert-butyldimethylsilyl group.

The hydrocarbylene group optionally containing, as a hetero atom, at least one of a nitrogen atom and an oxygen atom in the formula (IIa) refers to either a hydrocarbylene group, or a hetero atom-containing hydrocarbylene group in which the hetero atom is at least one of a nitrogen atom and an oxygen atom. The hetero atom-containing hydrocarbylene group in which the hetero atom is at least one of a nitrogen atom and an oxygen atom may be a hetero atom-containing hydrocarbylene group in which the hetero atom is a nitrogen atom, or a hetero atom-containing hydrocarbylene group in which the hetero atom is an oxygen atom. Examples of hydrocarbylene groups include alkylene groups such as a trimethylene group, a tetramethylene group, a pentamethylene group, a hexamethylene group, a heptamethylene group, an octamethylene group, a decamethylene group, a dodecamethylene group, and a 2,2,4-trimethylhexane-1,6-diyl group; and alkenediyl groups such as a pent-2-ene-1,5-diyl group. The hetero atom-containing hydrocarbylene group in which the hetero atom is a nitrogen atom may be a group represented by —CH=N—CH=CH— or a group represented by —CH=N—CH$_2$—CH$_2$—. The hetero atom-containing hydrocarbylene group in which the hetero atom is an oxygen atom may be a group represented by —CH$_2$—CH$_2$—O—CH$_2$—CH$_2$—.

Preferably, $R^{22}$ and $R^{23}$ each are an alkyl group, or $R^{22}$ and $R^{23}$ are joined together to form an alkylene group. More preferably, $R^{22}$ and $R^{23}$ each are an alkyl group, and still more preferably a methyl group or an ethyl group.

Examples of the substituted amino group represented by the formula (IIa) in which $R^{22}$ and $R^{23}$ each are a hydrocarbyl group include dialkylamino groups such as a dimethylamino group, a diethylamino group, an ethylmethylamino group, a di-n-propylamino group, a diisopropylamino group, a di-n-butylamino group, a diisobutylamino group, a di-sec-butylamino group, and a di-tert-butylamino group; and diarylamino groups such as a diphenylamino group, and preferably dialkylamino groups, and more preferably a dimethylamino group, a diethylamino group, and a di-n-butylamino group. Examples of the substituted amino group in which $R^{22}$ and $R^{23}$ each are a substituted hydrocarbyl group whose substituent is a hydrocarbyloxy group include di(alkoxyalkyl)amino groups such as a di(methoxymethyl)amino group and a di(ethoxymethyl)amino group. Examples of the substituted amino group in which $R^{22}$ and $R^{23}$ each are a trihydrocarbylsilyl group include trialkylsilyl group-containing amino groups such as a bis(trimethylsilyl)amino group, a bis(tert-butyldimethylsilyl)amino group, and an N-trimethylsilyl-N-methylamino group.

Examples of the substituted amino group represented by the formula (IIa) in which $R^{22}$ and $R^{23}$ are joined together to form a hydrocarbylene group include 1-alkyleneimino groups such as a 1-trimethyleneimino group, a 1-pyrrolidino group, a 1-piperidino group, a 1-hexamethyleneimino group, a 1-heptamethyleneimino group, a 1-octamethyleneimino group, a 1-decamethyleneimino group, and a 1-dodecamethyleneimino group. Examples of the substituted amino group in which $R^{22}$ and $R^{23}$ are joined together to form a hydrocarbylene group containing a nitrogen atom as a hetero atom include a 1-imidazolyl group and a 4,5-dihydro-1-imidazolyl group. Examples of the substituted amino group in which $R^{22}$ and R²³ are joined together to form a hydrocarbylene group containing an oxygen atom as a hetero atom include a morpholino group.

The substituted amino group represented by the formula (IIa) is preferably a dialkylamino group or a 1-alkyleneimino group, more preferably a dialkylamino group, and still more preferably a dimethylamino group, a diethylamino group, or a di-n-butylamino group.

Examples of the hydrocarbyloxy group in the formula (II) include alkoxy groups such as a methoxy group, an ethoxy group, an n-propoxy group, an isopropoxy group, an n-butoxy group, a sec-butoxy group, and a tert-butoxy group; and aryloxy groups such as a phenoxy group and a benzyloxy group.

The optionally substituted hydrocarbyl group in the formula (II) refers to either a hydrocarbyl group or a substituted hydrocarbyl group. The substituted hydrocarbyl group may be a substituted hydrocarbyl group whose substituent is a hydrocarbyloxy group. Examples of hydrocarbyl groups include alkyl groups such as a methyl group, an ethyl group, an n-propyl group, an isopropyl group, an n-butyl group, a sec-butyl group, and a tert-butyl group; and aryl groups such as a phenyl group, a 4-methyl-1-phenyl group, and a benzyl group. Examples of the substituted hydrocarbyl group whose substituent is a hydrocarbyloxy group include alkoxyalkyl groups such as a methoxymethyl group, an ethoxymethyl group, and an ethoxyethyl group.

Examples of the silicon-containing vinyl compound represented by the formula (II) in which one of $X^1$, $X^2$ and $X^3$ is a substituted amino group, and m is 0 include (dialkylamino) dialkylvinylsilanes such as (dimethylamino)dimethylvinylsilane, (ethylmethylamino)dimethylvinylsilane, (di-n-propylamino)dimethylvinylsilane, (diisopropylamino) dimethylvinylsilane, (dimethylamino)diethylvinylsilane, (ethylmethylamino)diethylvinylsilane, (di-n-propylamino) diethylvinylsilane, and (diisopropylamino)diethylvinylsilane; [bis(trialkylsilyl)amino]dialkylvinylsilanes such as [bis(trimethylsilyl)amino]dimethylvinylsilane, [bis(t-butyldimethylsilyl)amino]dimethylvinylsilane, [bis(trimethylsilyl)amino]diethylvinylsilane, and [bis(t-butyldimethylsilyl)amino]diethylvinylsilane; (dialkylamino)di(alkoxyalkyl) vinylsilanes such as (dimethylamino)di(methoxymethyl) vinylsilane, (dimethylamino)di(methoxyethyl)vinylsilane, (dimethylamino)di(ethoxymethyl)vinylsilane, (dimethylamino)di(ethoxyethyl)vinylsilane, (diethylamino)di(methoxymethyl)vinylsilane, (diethylamino)di(methoxyethyl)vinylsilane, (diethylamino)di(ethoxymethyl)vinylsilane, and (diethylamino)di(ethoxyethyl)vinylsilane; and cyclic aminodialkylvinylsilane compounds such as pyrrolidinodimethylvinylsilane, piperidinodimethylvinylsilane, hexamethyleneiminodimethylvinylsilane, 4,5-dihydroimidazolyldimethylvinylsilane, and morpholinodimethylvinylsilane.

Examples of the silicon-containing vinyl compound represented by the formula (II) in which one of $X^1$, $X^2$ and $X^3$ is a substituted amino group, and m is 1 include (dialkylamino) dialkylvinylphenylsilanes such as (dimethylamino)dimethyl-4-vinylphenylsilane, (dimethylamino)dimethyl-3-vinylphenylsilane, (diethylamino)dimethyl-4-vinylphenylsilane, (diethylamino)dimethyl-3-vinylphenylsilane, (di-n-propylamino)dimethyl-4-vinylphenylsilane, (di-n-propylamino) dimethyl-3-vinylphenylsilane, (di-n-butylamino)dimethyl-4-vinylphenylsilane, (di-n-butylamino)dimethyl-3-vinylphenylsilane, (dimethylamino)diethyl-4-vinylphenylsilane, (dimethylamino)diethyl-3-vinylphenylsilane, (diethylamino)diethyl-4-vinylphenylsilane, (diethylamino)diethyl-3-vinylphenylsilane, (di-n-propylamino)diethyl-4-vinylphenylsilane, (di-n-propylamino)diethyl-3-vinylphenylsilane, (di-n-butylamino)diethyl-4-vinylphenylsilane, and (di-n-butylamino)diethyl-3-vinylphenylsilane.

Examples of the silicon-containing vinyl compound represented by the formula (II) in which two of $X^1$, $X^2$ and $X^3$ are substituted amino groups, and m is 0 include bis(dialkylamino)alkylvinylsilanes such as bis(dimethylamino)methylvinylsilane, bis(diethylamino)methylvinylsilane, bis(di-n-propylamino)methylvinylsilane, bis(di-n-butylamino) methylvinylsilane, bis(dimethylamino)ethylvinylsilane, bis(diethylamino)ethylvinylsilane, bis(di-n-propylamino) ethylvinylsilane, and bis(di-n-butylamino)ethylvinylsilane; bis[bis(trialkylsilyl)amino]alkylvinylsilanes such as bis[bis(trimethylsilyl)amino]methylvinylsilane, bis[bis(tert-butyldimethylsilyl)amino]methylvinylsilane, bis[bis(trimethylsilyl)amino]ethylvinylsilane, and bis[bis(tert-butyldimethylsilyl)amino]ethylvinylsilane; bis(dialkylamino)alkoxyalkylsilanes such as bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino) methoxymethylvinylsilane, bis(diethylamino) methoxyethylvinylsilane, bis(diethylamino) ethoxymethylvinylsilane, and bis(dimethylamino) ethoxyethylvinylsilane; and bis(cyclic amino) alkylvinylsilane compounds such as bis(pyrrolidinyl) methylvinylsilane, bis(piperidinyl)methylvinylsilane, bis(hexamethyleneimino)methylvinylsilane, bis(4,5-dihydroimidazolyl)methylvinylsilane, and bis(morpholino) methylvinylsilane.

Examples of the silicon-containing vinyl compound represented by the formula (II) in which two of $X^1$, $X^2$ and $X^3$ are substituted amino groups, and m is 1 include bis(dialkylamino)alkylvinylphenylsilanes such as bis(dimethylamino)methyl-4-vinylphenylsilane, bis(dimethylamino)methyl-3-vinylphenylsilane, bis(diethylamino)methyl-4-vinylphenylsilane, bis(diethylamino)methyl-3-vinylphenylsilane, bis(di-n-propylamino)methyl-4-vinylphenylsilane, bis(di-n-propylamino)methyl-3-vinylphenylsilane, bis(di-n-butylamino)methyl-4-vinylphenylsilane, bis(di-n-butylamino)methyl-3-vinylphenylsilane, bis(dimethylamino)ethyl-4-vinylphenylsilane, bis(dimethylamino)ethyl-3-vinylphenylsilane, bis(diethylamino)ethyl-4-vinylphenylsilane, bis(diethylamino)ethyl-3-vinylphenylsilane, bis(di-n-propylamino)ethyl-4-vinylphenylsilane, bis(di-n-propylamino)ethyl-3-vinylphenylsilane, bis(di-n-butylamino)ethyl-4-vinylphenylsilane, and bis(di-n-butylamino)ethyl-3-vinylphenylsilane.

Examples of the silicon-containing vinyl compound represented by the formula (II) in which the three of $X^1$, $X^2$ and $X^3$ are substituted amino groups, and m is 0 include tris(dialkylamino)vinylsilanes such as tris(dimethylamino)vinylsilane, tris(diethylamino)vinylsilane, tris(di-n-propylamino)vinylsilane, and tris(di-n-butylamino)vinylsilane.

Examples of the silicon-containing vinyl compound represented by the formula (II) in which the three of $X^1$, $X^2$ and $X^3$ are substituted amino groups, and m is 1 include tris(dialkylamino)vinylphenylsilanes such as tris(dimethylamino)-4-vinylphenylsilane, tris(dimethylamino)-3-vinylphenylsilane, tris(diethylamino)-4-vinylphenylsilane, tris(diethylamino)-3-vinylphenylsilane, tris(di-n-propylamino)-4-vinylphenylsilane, tris(di-n-propylamino)-3-vinylphenylsilane, tris(di-n-butylamino)-4-vinylphenylsilane, and tris(di-n-butylamino)-3-vinylphenylsilane.

Examples of the silicon-containing vinyl compound represented by the formula (II) in which none of $X^1$, $X^2$ and $X^3$ are substituted amino groups, and m is 0 include trialkoxyvinylsilanes such as trimethoxyvinylsilane, triethoxyvinylsilane, and tripropoxyvinylsilane; dialkoxyalkylvinylsilanes such as methyldimethoxyvinylsilane and methyldiethoxyvinylsilane; dialkoxyarylvinylsilanes such as di(tert-pentoxy)phenylvinylsilane and di(tert-butoxy)phenylvinylsilane; monoalkoxydialkylvinylsilanes such as dimethylmethoxyvinylsilane; monoalkoxydiarylvinylsilanes such as tert-butoxydiphenylvinylsilane and tert-pentoxydiphenylvinylsilane; monoalkoxyalkylarylvinylsilanes such as tert-butoxymethylphenylvinylsilane and tert-butoxyethylphenylvinylsilane; and substituted alkoxyvinylsilane compounds such as tris(β-methoxyethoxy)vinylsilane.

Other silicon-containing vinyl compounds include bis(trialkylsilyl)aminostyrenes such as 4-N,N-bis(trimethylsilyl)aminostyrene and 3-N,N-bis(trimethylsilyl)aminostyrene; and bis(trialkylsilyl)aminoalkylstyrenes such as 4-bis(trimethylsilyl)aminomethylstyrene, 3-bis(trimethylsilyl)aminomethylstyrene, 4-bis(trimethylsilyl)aminoethylstyrene, and 3-bis(trimethylsilyl)aminoethylstyrene.

The silicon-containing vinyl compound is preferably a compound represented by the formula (II), more preferably a compound represented by the formula (II) in which m is 0, and still more preferably a compound represented by the formula (II) in which two of $X^1$, $X^2$ and $X^3$ are dialkyl amino groups.

The silicon-containing vinyl compound is particularly preferably bis(dimethylamino)methylvinylsilane, bis(diethylamino)methylvinylsilane, or bis(di-n-butylamino)methylvinylsilane.

In the production of the conjugated diene polymer, the amount of the silicon-containing vinyl compound to be used based on 100% by mass of the total monomer component used in the polymerization is preferably not less than 0.01% by mass, more preferably not less than 0.02% by mass, and still more preferably not less than 0.05% by mass, in terms of enhancing the fuel economy, wet-grip performance, abrasion resistance, and processability in a balanced manner. The amount is preferably not more than 20% by mass, more preferably not more than 2% by mass, and still more preferably not more than 1% by mass, in terms of increasing the cost efficiency and tensile strength at break.

In the production of the conjugated diene polymer, the monomer component may further include polymerizable monomers in addition to the conjugated diene compound and silicon-containing vinyl compound. The monomers include, for example, aromatic vinyl compounds, vinyl nitriles, and unsaturated carboxylic acid esters. Examples of aromatic vinyl compounds include styrene, α-methylstyrene, vinyltoluene, vinylnaphthalene, divinylbenzene, trivinylbenzene, and divinylnaphthalene. Examples of vinyl nitriles include acrylonitrile. Examples of unsaturated carboxylic acid esters include methyl acrylate, ethyl acrylate, methyl methacrylate, and ethyl methacrylate. Aromatic vinyl compounds are preferred among the above examples, and styrene is more preferred.

In the case where an aromatic vinyl compound is used in the production of the conjugated diene polymer, the amount of the aromatic vinyl compound based on 100% by mass in total of the conjugated diene compound and the aromatic vinyl compound is preferably not less than 10% by mass (the amount of the conjugated diene compound is not more than 90% by mass), and more preferably not less than 15% by mass (the amount of the conjugated diene compound is not more than 85% by mass). Also, from a viewpoint of fuel economy, the amount of the aromatic vinyl compound is preferably not more than 50% by mass (the amount of the conjugated diene compound is not less than 50% by mass), and more preferably not more than 45% by mass (the amount of the conjugated diene compound is not less than 55% by mass).

In the production of the conjugated diene polymer, polymerization is preferably performed in a hydrocarbon solvent. The hydrocarbon solvent refers to any solvent that does not deactivate the polymerization initiator represented by the formula (I), and examples thereof include aliphatic hydrocarbons, aromatic hydrocarbons, and alicyclic hydrocarbons. Examples of aliphatic hydrocarbons include propane, n-butane, iso-butane, n-pentane, iso-pentane, n-hexane, n-heptane, and n-octane. Examples of aromatic hydrocarbons include benzene, toluene, xylene, and ethylbenzene. Examples of alicyclic hydrocarbons include cyclopentane and cyclohexane. The hydrocarbon solvent may be a mixture of various components, such as industrial hexane. It is preferably a hydrocarbon having 2 to 12 carbon atoms.

The polymerization reaction may be performed in the presence of an agent for adjusting the vinyl bond content of the conjugated diene units, or an agent for adjusting the distribution of a conjugated diene unit and a monomer unit based on a monomer other than conjugated dienes in a conjugated diene polymer chain (hereinafter, collectively referred to as "adjusting agent"). Examples of such agents include ether compounds, tertiary amine compounds, and phosphine compounds. Examples of the ether compounds include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Examples of the tertiary amine compounds include triethylamine, tripropylamine, tributylamine, N,N,N',N'-tetramethylethylenediamine, N,N-diethylaniline, pyridine, and quinoline. Examples of the phosphine compounds include trimethylphosphine, triethylphosphine, and triphenylphosphine. One or more kinds of them may be used.

In the production of the conjugated diene polymer, the polymerization initiator may be supplied to a polymerization reactor before the monomer component is supplied to the polymerization reactor; or the polymerization initiator may be supplied to the polymerization reactor after the total monomer component to be used in polymerization is supplied to the polymerization reactor; or the polymerization initiator may be supplied to the polymerization reactor after a part of the monomer component to be used in polymerization is supplied to the polymerization reactor. The polymerization initiator may be supplied at once or continuously to the polymerization reactor.

In the production of the conjugated diene polymer, the monomer component may be supplied at once, continuously, or intermittently to the polymerization reactor. Moreover, monomers may be supplied separately or simultaneously to the polymerization reactor.

In the production of the conjugated diene polymer, the polymerization temperature is typically 25° C. to 100° C., preferably 35° C. to 90° C., and more preferably 50° C. to 80° C. The polymerization time is typically 10 minutes to 5 hours.

The conjugated diene polymer is obtained by reacting a compound containing a nitrogen atom and/or a silicon atom with an active end of a copolymer obtained by polymerizing a monomer component including a conjugated diene compound and a silicon-containing vinyl compound using a polymerization initiator represented by the formula (I) (the active end of the copolymer is considered to contain the alkali metal derived from the polymerization initiator) (chain-end modification reaction). Specifically, the conjugated diene polymer is obtained by adding a compound containing a nitrogen atom and/or a silicon atom to a polymerization solution and mixing them. The amount of the compound containing a nitrogen atom and/or a silicon atom to be added to the polymerization solution is typically 0.1 to 3 mol, preferably 0.5 to 2 mol, and more preferably 0.7 to 1.5 mol, per mol of the alkali metal derived from the polymerization initiator represented by the formula (I).

The chain-end modification reaction is typically performed at a temperature of 25° C. to 100° C., preferably 35° C. to 90° C., and more preferably 50° C. to 80° C. The time period for the chain-end reaction is typically 60 seconds to 5 hours, preferably 5 minutes to 1 hour, and more preferably 15 minutes to 1 hour.

The compound containing a nitrogen atom and/or a silicon atom may preferably be a compound containing a nitrogen atom and a carbonyl group.

The compound containing a nitrogen atom and a carbonyl group is preferably a compound represented by the following formula (III):

[Chem. 8]

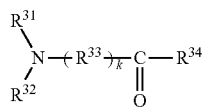

(III)

wherein $R^{31}$ represents an optionally substituted hydrocarbyl group, or is joined to $R^{32}$ to represent a hydrocarbylene group optionally containing, as a hetero atom, at least one of a nitrogen atom and an oxygen atom, or is joined to $R^{34}$ to represent a divalent group; $R^{32}$ represents an optionally substituted hydrocarbyl group, or is joined to $R^{31}$ to represent a hydrocarbylene group optionally containing, as a hetero atom, at least one of a nitrogen atom and an oxygen atom; $R^{34}$ represents an optionally substituted hydrocarbyl group or a hydrogen atom, or is joined to $R^{31}$ to represent a divalent group; $R^{33}$ represents a divalent group; and k represents 0 or 1.

In the formula (III), the optionally substituted hydrocarbyl group for $R^{31}$, $R^{32}$ and $R^{34}$ refers to either a hydrocarbyl group or a substituted hydrocarbyl group. The substituted hydrocarbyl group may be a substituted hydrocarbyl group whose substituent is a hydrocarbyloxy group, or a substituted hydrocarbyl group whose substituent is a substituted amino group. Examples of hydrocarbyl groups include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group. Examples of the substituted hydrocarbyl group whose substituent is a hydrocarbyloxy group include alkoxyalkyl groups such as a methoxymethyl group, an ethoxymethyl group, and an ethoxyethyl group. Examples of the substituted hydrocarbyl group whose substituent is a substituted amino group include (N,N-dialkylamino)alkyl groups such as a 2-(N,N-dimethylamino)ethyl group, a 2-(N,N-diethylamino)ethyl group, a 3-(N,N-dimethylamino)propyl group, and a 3-(N,N-diethylamino)propyl group; (N,N-dialkylamino)aryl groups such as a 4-(N,N-dimethylamino)phenyl group, a 3-(N,N-dimethylamino)phenyl group, a 4-(N,N-diethylamino)phenyl group, and a 3-(N,N-diethylamino)phenyl group; (N,N-dialkylamino)alkylaryl groups such as a 4-(N,N-dimethylamino)methylphenyl group and a 4-(N,N-dimethylamino)ethylphenyl group; cyclic amino group-containing alkyl groups such as a 3-pyrrolidinopropyl group, a 3-piperidinopropyl group, and a 3-imidazolylpropyl group; cyclic amino group-containing aryl groups such as a 4-pyrrolidinophenyl group, a 4-piperidinophenyl group, and a 4-imidazolylphenyl group; and cyclic amino group-containing alkylaryl groups such as a 4-pyrrolidinoethylphenyl group, a 4-piperidinoethylphenyl group, and a 4-imidazolylethylphenyl group.

In the formula (III), the hydrocarbylene group optionally containing, as a hetero atom, at least one of a nitrogen atom and an oxygen atom, formed by joining $R^{31}$ and $R^{32}$, refers to either a hydrocarbylene group or a hetero atom-containing hydrocarbylene group in which the hetero atom is at least one of a nitrogen atom and an oxygen atom. The hetero atom-containing hydrocarbylene group in which the hetero atom is at least one of a nitrogen atom and an oxygen atom may be a hetero atom-containing hydrocarbylene group in which the hetero atom is a nitrogen atom, or a hetero atom-containing hydrocarbylene group in which the hetero atom is an oxygen atom. Examples of hydrocarbylene groups include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. The hetero atom-containing hydrocarbylene group in which the hetero atom is a nitrogen atom may be a group represented by —CH=N—CH=CH— or a group represented by —CH=N—CH$_2$—CH$_2$—. The hetero atom-containing hydrocarbylene group in which the hetero atom is an oxygen atom may be a group represented by —(CH$_2$)$_s$—O—(CH$_2$)$_t$— where s and t each are an integer of 1 or more).

In the formula (III), examples of the divalent group formed by joining $R^{31}$ and $R^{34}$, and the divalent group of $R^{33}$ include hydrocarbylene groups, hetero atom-containing hydrocarbylene groups in which the hetero atom is a nitrogen atom, hetero atom-containing hydrocarbylene groups in which the hetero atom is an oxygen atom, groups in which a hydrocarbylene group and an oxygen atom are bonded, and groups in which a hydrocarbylene group and a group represented by —NR$^{35}$— (where $R^{35}$ represents a hydrocarbyl group or a hydrogen atom) are bonded. Examples of hydrocarbylene groups include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of hetero atom-containing hydrocarbylene groups in which the hetero atom is a nitrogen atom include a group represented by —CH=N—CH=CH— and a group represented by —CH=N—CH$_2$—CH$_2$—. Examples of hetero atom-containing hydrocarbylene groups in which the hetero atom is an oxygen atom include groups represented by —(CH$_2$)$_s$—O—(CH$_2$)$_t$— where s and t each are an integer of 1 or more. Examples of groups in which a hydrocarbylene group and an oxygen atom are bonded include groups represented by —(CH$_2$)$_r$—O— where r represents an integer of 1 or more. Examples of groups in which a hydrocarbylene group and a group represented by —NR$^{35}$— (where $R^{35}$ represents a hydrocarbyl group or a hydrogen atom) are bonded include groups represented by —(CH$_2$)$_p$—NR$^{35}$— where $R^{35}$ represents a hydrocarbyl group (preferably a hydrocarbyl group having 1 to 6 carbon atoms), or a hydrogen atom; and p represents an integer of 1 or more.

The compound represented by the formula (III) may preferably be a compound of the formula (III) in which k is 0, and $R^{34}$ is an optionally substituted hydrocarbyl group or a hydrogen atom, which is represented by the following formula (IIIa):

[Chem. 9]

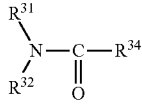

(IIIa)

wherein $R^{31}$ represents an optionally substituted hydrocarbyl group, or is joined to $R^{32}$ to represent a hydrocarbylene group optionally containing, as a hetero atom, at least one of a nitrogen atom and an oxygen atom; $R^{32}$ represents an optionally substituted hydrocarbyl group, or is joined to $R^{31}$ to represent a hydrocarbylene group optionally containing, as a hetero atom, at least one of a nitrogen atom and an oxygen atom; and $R^{34}$ represents an optionally substituted hydrocarbyl group or a hydrogen atom.

In the formula (IIIa), the optionally substituted hydrocarbyl group for $R^{31}$, $R^{32}$ and $R^{34}$, and the hydrocarbylene group optionally containing, as a hetero atom, at least one of a nitrogen atom and an oxygen atom, formed by joining $R^{31}$ and $R^{32}$, are described and mentioned as stated in the description of the formula (III).

In the formula (IIIa), preferably, $R^{31}$ is a hydrocarbyl group having 1 to 10 carbon atoms, or is joined to $R^{32}$ to form a hydrocarbylene group having 3 to 10 carbon atoms or a hetero atom-containing hydrocarbylene group having 3 to 10 carbon atoms in which the hetero atom is a nitrogen atom. More preferably, $R^{32}$ is an alkyl group having 1 to 10 carbon atoms or an aryl group having 6 to 10 carbon atoms, or is joined to $R^{32}$ to form an alkylene group having 3 to 10 carbon atoms, a group represented by —CH=N—C=CH—, or a group represented by —CH=N—CH$_2$—CH$_2$—. $R^{31}$ is still more preferably an alkyl group having 1 to 6 carbon atoms, and particularly preferably a methyl group or an ethyl group.

In the formula (IIIa), preferably, $R^{32}$ is a hydrocarbyl group having 1 to 10 carbon atoms, or is joined to $R^{31}$ to form a hydrocarbylene group having 3 to 10 carbon atoms or a hetero atom-containing hydrocarbylene group having 3 to 10 carbon atoms in which the hetero atom is a nitrogen atom. More preferably, $R^{32}$ is an alkyl group having 1 to 10 carbon atoms or an aryl group having 6 to 10 carbon atoms, or is joined to $R^{31}$ to form an alkylene group having 3 to 10 carbon atoms, a group represented by —CH=N—CH=CH—, or a group represented by —CH=N—CH$_2$—CH$_2$—. $R^{32}$ is still more preferably an alkyl group having 1 to 6 carbon atoms, and particularly preferably a methyl group or an ethyl group.

In the formula (IIIa), $R^{34}$ is preferably a hydrocarbyl group or a hydrogen atom, more preferably a hydrocarbyl group having 1 to 10 carbon atoms or a hydrogen atom, still more preferably an alkyl group having 1 to 6 carbon atoms or a hydrogen atom, and particularly preferably a hydrogen atom, a methyl group or an ethyl group.

Examples of the compound represented by the formula (IIIa) in which $R^{34}$ is a hydrocarbyl group include N,N-dihydrocarbylacetamides such as N,N-dimethylacetamide, N,N-diethylacetamide, and N-methyl-N-ethylacetamide; N,N-dihydrocarbylacrylamides such as N,N-dimethylacrylamide, N,N-diethylacrylamide, and N-methyl-N-ethylacrylamide; and N,N-dihydrocarbylmethacrylamides such as N,N-dimethylmethacrylamide, N,N-diethylmethacrylamide, and N-methyl-N-ethylmethacrylamide.

Examples of the compound represented by the formula (IIIa) in which $R^{34}$ is a hydrogen atom include N,N-dihydrocarbylformamides such as N,N-dimethylformamide, N,N-dimethylformamide, and N-methyl-N-ethylformamide.

The compound represented by the formula (III) may preferably be a compound of the formula (III) in which k is 0; and $R^{34}$ is joined to $R^{31}$ to form a divalent group, which is represented by the following formula (IIIb):

[Chem. 10]

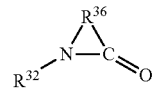

(IIb)

wherein $R^{32}$ represents an optionally substituted hydrocarbyl group; and $R^{36}$ represents a hydrocarbylene group, or a group in which a hydrocarbylene group and a group represented by —NR$^{35}$— are bonded, wherein $R^{35}$ represents a hydrocarbyl group or a hydrogen atom.

In the formula (IIIb), the optionally substituted hydrocarbyl group for $R^{32}$ is described and mentioned as stated in the description of the formula (III).

In the formula (IIIb), examples of the hydrocarbylene group for $R^{36}$ include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the group in which a hydrocarbylene group and a group represented by —NR$^{35}$— (where $R^{35}$ represents a hydrocarbyl group or a hydrogen atom) are bonded for $R^{36}$ include groups represented by —(CH$_2$)$_p$—NR$^{35}$— where $R^{35}$ represents a hydrocarbyl group or a hydrogen atom, and p represents an integer of 1 or more.

In the formula (IIIb), $R^{32}$ is preferably a hydrocarbyl group having 1 to 10 carbon atoms, more preferably an alkyl group having 1 to 10 carbon atoms or an aryl group having 6 to 10 carbon atoms, still more preferably an alkyl group having 1 to 6 carbon atoms or a phenyl group, and particularly preferably a methyl group, an ethyl group, or a phenyl group.

In the formula (IIIb), $R^{36}$ is preferably a hydrocarbylene group having 1 to 10 carbon atoms, or a group in which a hydrocarbylene group having 1 to 10 carbon atoms and a group represented by —NR$^{35}$— (where $R^{35}$ represents a hydrocarbyl group (preferably a hydrocarbyl group having 1 to 10 carbon atoms) or a hydrogen atom) are bonded, more preferably an alkylene group having 3 to 6 carbon atoms or a group represented by —(CH$_2$)$_p$—NR$^{35}$— where $R^{35}$ represents a hydrocarbyl group (preferably a hydrocarbyl group having 1 to 10 carbon atoms), and p represents an integer of not less than 1 (preferably an integer of 2 to 5), and still more preferably a trimethylene group, a tetramethylene group, a pentamethylene group, or a group represented by —(CH$_2$)$_2$—N(CH$_3$)—.

Examples of the compound represented by the formula (IIIb) in which $R^{36}$ is a hydrocarbylene group include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2- pyrrolidone, N-phenyl-2-pyrrolidone, N-tert-butyl-2-pyrrolidone, and N-methyl-5-methyl-2-pyrrolidone; N-hydrocarbyl-2-piperidones such as N-methyl-2-piperidone, N-vinyl-2-piperidone, and N-phenyl-2-piperidone; N-hydrocarbyl-ε-caprolactams such as N-methyl-ε-caprolactam and N-phenyl-ε-caprolactam; and N-hydrocarbyl-ω-laurilolactams such as N-methyl-ω-laurilolactam and N-vinyl-ω-laurilolactam. N-phenyl-2-pyrrolidone and N-methyl-ε-caprolactam are preferred among the above examples.

Examples of the compound represented by the formula (IIIb) in which $R^{36}$ is a group in which a hydrocarbylene group and a group represented by —$NR^{35}$— (where $R^{35}$ represents a hydrocarbyl group or a hydrogen atom) are bonded include 1,3-dihydrocarbyl-2-imidazolidinones such as 1,3-dimethyl-2-imidazolidinone, 1,3-diethyl-2-imidazolidinone, 1,3-divinyl-2-imidazolidinone, and 1-methyl-3-ethyl-2-imidazolidinone. Among the above examples, 1,3-dimethyl-2-imidazolidinone is preferred.

The compound represented by the formula (III) may preferably be a compound of the formula (III) in which k is 1; and $R^{33}$ is a hydrocarbylene group, which is represented by the following formula (IIIc):

[Chem. 11]

(IIIc)

wherein $R^{31}$ represents an optionally substituted hydrocarbyl group, or is joined to $R^{32}$ to represent a hydrocarbylene group optionally containing, as a hetero atom, at least one of a nitrogen atom and an oxygen atom; $R^{32}$ represents an optionally substituted hydrocarbyl group, or is joined to $R^{31}$ to represent a hydrocarbylene group optionally containing, as a hetero atom, at least one of a nitrogen atom and an oxygen atom; $R^{33}$ represents a hydrocarbylene group; and $R^{34}$ represents an optionally substituted hydrocarbyl group or a hydrogen atom.

In the formula (IIIc), the optionally substituted hydrocarbyl group for $R^{31}$, $R^{32}$ and $R^{34}$; the hydrocarbylene group optionally containing, as a hetero atom, at least one of a nitrogen atom and an oxygen atom, formed by joining $R^{31}$ and $R^{32}$; and the hydrocarbylene group for $R^{33}$ are described and mentioned as stated in the description of the formula (III).

In the formula (IIIc), $R^{33}$ is preferably a hydrocarbylene group having 1 to 10 carbon atoms, more preferably an alkylene group having 1 to 10 carbon atoms or an arylene group having 6 to 10 carbon atoms, still more preferably an alkylene group having 1 to 6 carbon atoms or a phenylene group, and particularly preferably an ethylene group, a trimethylene group, or a 1,4-phenylene group.

In the formula (IIIc), $R^{34}$ is preferably a hydrocarbyl group having 1 to 10 carbon atoms, or a substituted hydrocarbyl group having 1 to 10 carbon atoms whose substituent is a dialkylamino group, more preferably an alkyl group having 1 to 6 carbon atoms, an aryl group having 6 to 10 carbon atoms, a dialkylaminoalkyl group having 1 to 6 carbon atoms, or a dialkylaminoaryl group having 6 to 10 carbon atoms, and still more preferably a methyl group, an ethyl group, a phenyl group, a 3-dimethylaminoethyl group, or a 4-diethylaminophenyl group.

In the formula (IIIc), preferably, $R^{31}$ is a hydrocarbyl group having 1 to 10 carbon atoms, or is joined to $R^{32}$ to form a hydrocarbylene group having 3 to 10 carbon atoms, or a hetero atom-containing hydrocarbylene group having 3 to 10 carbon atoms in which the hetero atom is a nitrogen atom or an oxygen atom. More preferably, $R^{31}$ is an alkyl group having 1 to 10 carbon atoms or an aryl group having 6 to 10 carbon atoms, or is joined to $R^{32}$ to form an alkylene group having 3 to 10 carbon atoms, a group represented by —CH=N—CH=CH—, a group represented by —CH=N—$CH_2$—$CH_2$—, or a group represented by —$(CH_2)_2$—O—$(CH_2)_2$—. Still more preferably, $R^{31}$ is an alkyl group having 1 to 6 carbon atoms, or is joined to $R^{32}$ to form an alkylene group having 3 to 6 carbon atoms, a group represented by —CH=N—CH=CH—, or a group represented by —CH=N—$CH_2$—$OH_2$—. Particularly preferably, $R^{31}$ is a methyl group or an ethyl group, or is joined to $R^{32}$ to form a tetramethylene group, a hexamethylene group, or a group represented by —CH=N—CH=CH—.

In the formula (IIIc), preferably, $R^{32}$ is a hydrocarbyl group having 1 to 10 carbon atoms, or is joined to $R^{31}$ to form a hydrocarbylene group having 3 to 10 carbon atoms, or a hetero atom-containing hydrocarbylene group having 3 to 10 carbon atoms in which the hetero atom is a nitrogen atom or an oxygen atom. More preferably, $R^{32}$ is an alkyl group having 1 to 10 carbon atoms or an aryl group having 6 to 10 carbon atoms, or is joined to $R^{31}$ to form an alkylene group having 3 to 10 carbon atoms, a group represented by —CH=N—CH=CH—, a group represented by —CH=N—$CH_2$—$CH_2$—, or a group represented by —$(CH_2)_2$—O—$(CH_2)_2$—. Still more preferably, $R^{32}$ is an alkyl group having 1 to 6 carbon atoms, or is joined to $R^{31}$ to form an alkylene group having 3 to 6 carbon atoms, a group represented by —CH=N—CH=CH—, or a group represented by —CH=N—$CH_2$—$CH_2$—. Particularly preferably, $R^{32}$ is a methyl group or an ethyl group, or is joined to $R^{31}$ to form a tetramethylene group, a hexamethylene group, or a group represented by —CH=N—CH=CH—.

Examples of the compound represented by the formula (IIIc) in which $R^{34}$ is a hydrocarbyl group include 4-N,N-dihydrocarbylaminoacetophenones such as 4-(N,N-dimethylamino)acetophenone, 4-N-methyl-N-ethylaminoacetophenone, and 4-N,N-diethylaminoacetophenone; and 4-cyclic amino acetophenone compounds such as 4'-(imidazol-1-yl)acetophenone and 4-pyrazolylacetophenone. Among the above examples, 4-cyclic amino acetophenone compounds are preferred, and 4'-(imidazol-1-yl)acetophenone is more preferred.

Examples of the compound represented by the formula (IIIc) in which $R^{34}$ is a substituted hydrocarbyl group include bis(dihydrocarbylaminoalkyl)ketones such as 1,7-bis(methylethylamino)-4-heptanone and 1,3-bis(diphenylamino)-2-propanone; 4-(dihydrocarbylamino)benzophenones such as 4-N,N-dimethylaminobenzophenone, 4-N,N-di-t-butylaminobenzophenone, and 4-N,N-diphenylaminobenzophenone; and 4,4'-bis(dihydrocarbylamino)benzophenones such as 4,4'-bis(dimethylamino)benzophenone, 4,4'-bis(diethylamino)benzophenone, and 4,4'-bis(diphenylamino)benzophenone. Among the above examples, 4,4'-bis(dihydrocarbylamino)benzophenones are preferred, and 4,4'-bis(diethylamino)benzophenone is more preferred.

The compound represented by the formula (III) may preferably be a compound of the formula (III) in which k is 1, and $R^{33}$ is a group in which a hydrocarbylene group and an oxygen atom are bonded, or a group in which a hydrocarbylene group and a group represented by —$NR^{35}$— (where $R^{35}$ represents a hydrocarbyl group or a hydrogen atom) are bonded, which is represented by the following formula (IIId):

[Chem. 12]

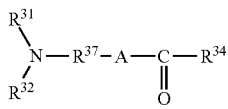

(IIId)

wherein $R^{31}$ represents an optionally substituted hydrocarbyl group, or is joined to $R^{32}$ to represent a hydrocarbylene group optionally containing, as a hetero atom, at least one of a nitrogen atom and an oxygen atom; $R^{32}$ represents an optionally substituted hydrocarbyl group, or is joined to $R^{31}$ to represent a hydrocarbylene group optionally containing, as a hetero atom, at least one of a nitrogen atom and an oxygen atom; $R^{37}$ represents a hydrocarbylene group; A represents an oxygen atom or —$NR^{35}$— where $R^{35}$ represents a hydrocarbyl group or a hydrogen atom; and $R^{34}$ represents an optionally substituted hydrocarbyl group or a hydrogen atom.

In the formula (IIId), the optionally substituted hydrocarbyl group for $R^{31}$, $R^{32}$ and $R^{34}$, and the hydrocarbylene group optionally containing, as a hetero atom, at least one of a nitrogen atom and an oxygen atom, formed by joining $R^{31}$ and $R^{32}$, are described and mentioned as stated in the description of the formula (III). The hydrocarbyl group for $R^{35}$ is as described for $R^{31}$, $R^{32}$, and $R^{34}$.

In the formula (IIId), A is preferably an oxygen atom or a group represented by —$NR^{35}$— (where $R^{35}$ is a hydrocarbyl group (preferably a hydrocarbylene group having 1 to 5 carbon atoms) or a hydrogen atom), more preferably an oxygen atom or a group represented by —NH—, and still more preferably a group represented by —NH—.

In the formula (IIId), examples of the hydrocarbylene group for $R^{37}$ include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group.

In the formula (IIId), $R^{34}$ is preferably a hydrocarbyl group having 1 to 10 carbon atoms, more preferably an alkenyl group having 2 to 5 carbon atoms, and still more preferably a vinyl group.

In the formula (IIId), $R^{37}$ is preferably a hydrocarbylene group having 1 to 10 carbon atoms, more preferably an alkylene group having 1 to 6 carbon atoms, still more preferably an ethylene group or a trimethylene group, and particularly preferably a trimethylene group.

In the formula (IIId), preferably, $R^{31}$ is a hydrocarbyl group having 1 to 10 carbon atoms, or is joined to $R^{32}$ to form a hydrocarbylene group having 3 to 10 carbon atoms, or a hetero atom-containing hydrocarbylene group having 3 to 10 carbon atoms in which the hetero atom is a nitrogen atom or an oxygen atom. More preferably, $R^{31}$ is an alkyl group having 1 to 10 carbon atoms or an aryl group having 6 to 10 carbon atoms, or is joined to $R^{32}$ to form an alkylene group having 3 to 10 carbon atoms, a group represented by —CH=N—CH=CH—, a group represented by —CH=N—CH$_2$—CH$_2$—, or a group represented by —(CH$_2$)$_2$—O—(CH$_2$)$_2$—. Still more preferably, $R^{31}$ is an alkyl group having 1 to 6 carbon atoms, or is joined to $R^{32}$ to form an alkylene group having 3 to 6 carbon atoms, a group represented by —CH=N—CH=CH—, or a group represented by —CH=N—CH$_2$—CH$_2$—. Particularly preferably, $R^{31}$ is a methyl group or an ethyl group, or is joined to $R^{32}$ to form a tetramethylene group, a hexamethylene group, or a group represented by —CH=N—CH=CH—.

In the formula (IIId), preferably, $R^{32}$ is a hydrocarbyl group having 1 to 10 carbon atoms, or is joined to $R^{31}$ to form a hydrocarbylene group having 3 to 10 carbon atoms, or a hetero atom-containing hydrocarbylene group having 3 to 10 carbon atoms in which the hetero atom is a nitrogen atom or an oxygen atom. More preferably, $R^{32}$ is an alkyl group having 1 to 10 carbon atoms or an aryl group having 6 to 10 carbon atoms, or is joined to $R^{31}$ to form an alkylene group having 3 to 10 carbon atoms, a group represented by —CH=N—CH=CH—, a group represented by —CH=N—CH$_2$—CH$_2$—, or a group represented by —(CH$_2$)$_2$—O—(CH$_2$)$_2$—. Still more preferably, $R^{32}$ is an alkyl group having 1 to 6 carbon atoms, or is joined to $R^{31}$ to form an alkylene group having 3 to 6 carbon atoms, a group represented by —CH=N—CH=CH—, or a group represented by —CH=N—CH$_2$—CH$_2$—. Particularly preferably, $R^{32}$ is a methyl group or an ethyl group, or is joined to $R^{31}$ to form a tetramethylene group, a hexamethylene group, or a group represented by —CH=N—CH=CH—.

Examples of the compound represented by the formula (IIId) in which A is an oxygen atom include 2-N,N-dihydrocarbylaminoethyl acrylates such as 2-N,N-dimethylaminoethyl acrylate and 2-N,N-diethylaminoethyl acrylate; 3-N,N-dihydrocarbylaminopropyl acrylates such as 3-N,N-dimethylaminopropyl acrylate; 2-N,N-dihydrocarbylaminoethyl methacrylates such as 2-N,N-dimethylaminoethyl methacrylate and 2-N,N-diethylaminoethyl methacrylate; and 3-N,N-dihydrocarbylaminopropyl methacrylates such as 3-N,N-dimethylaminopropyl methacrylate. Preferred are 3-N,N-dihydrocarbylaminopropyl acrylates, and more preferred is 3-N,N-dimethylaminopropyl acrylate.

Examples of the compound represented by the formula (IIId) in which A is a group represented by —$NR^{35}$— (where $R^{35}$ represents a hydrocarbyl group or a hydrogen atom) include N,N-dihydrocarbylaminoethylacrylamides such as N,N-dimethylaminoethylacrylamide and N,N-diethylaminoethylacrylamide; N,N-dihydrocarbylaminopropylacrylamides such as N,N-dimethylaminopropylacrylamide and N,N-diethylaminopropylacrylamide; N,N-dihydrocarbylaminobutylacrylamides such as N,N-dimethylaminobutylacrylamide and N,N-diethylaminobutylacrylamide; N,N-dihydrocarbylaminoethylmethacrylamides such as N,N-dimethylaminoethylmethacrylamide and N,N-diethylaminoethylmethacrylamide; N,N-dihydrocarbylaminopropylmethacrylamides such as N,N-dimethylaminopropylmethacrylamide and N,N-diethylaminopropylmethacrylamide; and N,N-dihydrocarbylaminobutylmethacrylamides such as N,N-dimethylaminobutylmethacrylamide and N,N-diethylaminobutylmethacrylamide. Preferred are N,N-dihydrocarbylaminopropylacrylamides, and more preferred is N,N-dimethylaminopropylacrylamide.

The compound represented by the formula (III) is preferably a compound represented by the formula (IIId), particularly preferably an N,N-dihydrocarbylaminopropylacrylamide, and most preferably N,N-dimethylaminopropylacrylamide.

Preferred examples of the compound containing a nitrogen atom and/or a silicon atom, other than those described above, include alkoxysilyl group-containing compounds.

The alkoxysilyl group-containing compound is preferably a compound containing a nitrogen atom and an alkoxysilyl group, and more preferably a compound represented by the following formula (IV):

[Chem. 13]

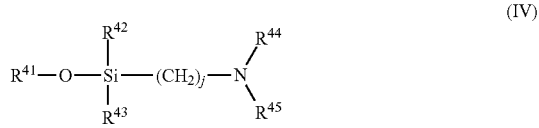

(IV)

wherein $R^{41}$ represents a hydrocarbyl group; $R^{42}$ and $R^{43}$ each represent a hydrocarbyl group or a hydrocarbyloxy group; $R^{44}$ represents an optionally substituted hydrocarbyl group or a trihydrocarbylsilyl group, or is joined to $R^{45}$ to represent a hydrocarbylene group optionally containing, as a hetero atom, at least one selected from the group consisting of a silicon atom, a nitrogen atom and an oxygen atom; $R^{45}$ represents an optionally substituted hydrocarbyl group or a trihydrocarbylsilyl group, or is joined to $R^{44}$ to represent a hydrocarbylene group optionally containing, as a hetero atom, at least one selected from the group consisting of a silicon atom, a nitrogen atom and an oxygen atom; and j represents an integer of 1 to 5.

In the formula (IV), the optionally substituted hydrocarbyl group refers to either a hydrocarbyl group or a substituted hydrocarbyl group. Examples of the hydrocarbyl group include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group, and preferably alkyl groups, and more preferably a methyl group or an ethyl group. Examples of the substituted hydrocarbyl group include oxacycloalkyl groups such as an oxiranyl group and a tetrahydrofuranyl group, and preferably a tetrahydrofuranyl group.

Herein, the oxacycloalkyl group refers to a group in which $CH_2$ on an alicyclic ring of a cycloalkyl group is replaced with an oxygen atom.

Examples of the hydrocarbyloxy group include alkoxy groups such as a methoxy group, an ethoxy group, an n-propoxy group, an isopropoxy group, an n-butoxy group, a sec-butoxy group, and a tert-butoxy group; and aryloxy groups such as a phenoxy group and a benzyloxy group, and preferably alkoxy groups, and more preferably a methoxy group or an ethoxy group.

Examples of the trihydrocarbylsilyl group include a trimethylsilyl group and a tert-butyl-dimethylsilyl group, and preferably a trimethylsilyl group.

The hydrocarbylene group optionally containing, as a hetero atom, at least one selected from the group consisting of a silicon atom, a nitrogen atom and an oxygen atom refers to either a hydrocarbylene group, or a hetero atom-containing hydrocarbylene group in which the hetero atom is at least one selected from the group consisting of a silicon atom, a nitrogen atom and an oxygen atom. The hetero atom-containing hydrocarbylene group in which the hetero atom is at least one selected from the group consisting of a silicon atom, a nitrogen atom and an oxygen atom may be a hetero atom-containing hydrocarbylene group in which the hetero atom is a silicon atom, a hetero atom-containing hydrocarbylene group in which the hetero atom is a nitrogen atom, or a hetero atom-containing hydrocarbylene group in which the hetero atom is an oxygen atom. Examples of hydrocarbylene groups include alkylene groups such as a tetramethylene group, a pentamethylene group, a hexamethylene group, a pentan-2-en-1,5-diyl group, and a 2,2,4-trimethylhexane-1,6-diyl group. Among them, alkylene groups having 4 to 7 carbon atoms are preferred, and a pentamethylene group or a hexamethylene group is particularly preferred. The hetero atom-containing hydrocarbylene group in which the hetero atom is a silicon atom may be a group represented by $-Si(CH_3)_2-CH_2-CH_2-Si(CH_3)_2-$. The hetero atom-containing hydrocarbylene group in which the hetero atom is a nitrogen atom may be a group represented by $-CH=N-CH=CH-$, or a group represented by $-CH=N-CH_2-CH_2-$. The hetero atom-containing hydrocarbylene group in which the hetero atom is an oxygen atom may be a group represented by $-CH_2-CH_2-O-CH_2-CH_2-$.

In the formula (IV), $R^{41}$ is preferably an alkyl group having 1 to 4 carbon atoms, and more preferably a methyl group or an ethyl group. $R^{42}$ and $R^{43}$ each are preferably a hydrocarbyloxy group, more preferably an alkoxy group having 1 to 4 carbon atoms, and still more preferably a methoxy group or an ethoxy group. $R^{44}$ and $R^{45}$ each are preferably a hydrocarbyl group, more preferably an alkyl group having 1 to 4 carbon atoms, and still more preferably a methyl group or an ethyl group. Moreover, j is preferably an integer of 2 to 4.

Examples of the compound represented by the formula (IV) include [(dialkylamino)alkyl]alkoxysilane compounds such as 3-dimethylaminopropyltriethoxysilane, 3-dimethylaminopropyltrimethoxysilane, 3-diethylaminopropyltriethoxysilane, 3-diethylaminopropyltrimethoxysilane, 3-dimethylaminopropylmethyldiethoxysilane, 2-dimethylaminoethyltriethoxysilane, and 2-dimethylaminoethyltrimethoxysilane; cyclic aminoalkylalkoxysilane compounds such as hexamethyleneiminomethyltrimethoxysilane, 3-hexamethyleneiminopropyltriethoxysilane, N-(3-triethoxysilylpropyl)-4,5-dihydroimidazole, and N-(3-trimethoxysilylpropyl)-4,5-imidazole; [di(tetrahydrofuranyl)amino]alkylalkoxysilane compounds such as 3-[di(tetrahydrofuranyl)amino]propyltrimethoxysilane and 3-[di(tetrahydrofuranyl)amino]propyltriethoxysilane; and N,N-bis(trialkylsilyl)aminoalkylalkoxysilane compounds such as N,N-bis(trimethylsilyl)aminopropylmethyldimethoxysilane and N,N-bis(trimethylsilyl)aminopropylmethyldiethoxysilane. Among the above examples, [(dialkylamino)alkyl]alkoxysilane compounds are preferred, and 3-dimethylaminopropyltriethoxysilane, 3-dimethylaminopropyltrimethoxysilane, 3-diethylaminopropyltriethoxysilane, and 3-diethylaminopropyltrimethoxysilane are more preferred.

Alkoxysilyl group-containing compounds other than the aforementioned compounds containing a nitrogen atom and an alkoxysilyl group include tetraalkoxysilanes such as tetramethoxysilane, tetraethoxysilane, and tetra-n-propoxysilane; trialkoxyhydrocarbylsilanes such as methyltrimethoxysilane, methyltriethoxysilane, ethyltrimethoxysilane, and phenyltrimethoxysilane; trialkoxyhalosilanes such as trimethoxychlorosilane, triethoxychlorosilane, and tri-n-propoxychlorosilane; dialkoxydihydrocarbylsilanes such as dimethoxydimethylsilane, diethoxydimethylsilane, and dimethoxydiethylsilane; dialkoxydihalosilanes such as dimethoxydichlorosilane, diethoxydichlorosilane, and di-n-propoxydichlorosilane; monoalkoxytrihydrocarbylsilanes such as methoxytrimethylsilane; monoalkoxytrihalosilanes such as methoxytrichlorosilane and ethoxytrichlorosilane; (glycidoxyalkyl)alkoxysilane compounds such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, and (3-glycidoxypropyl)methyldimethoxysilane; (3,4-epoxycyclohexyl)alkylalkoxysilane compounds such as 2-(3,4-epoxycyclohexyl)ethyltrimethoxysilane, 2-(3,4-epoxycyclohexyl)ethyltriethoxysilane, and 2-(3,4-epoxycyclohexyl)ethyl (methyl)dimethoxysilane; alkoxysilylalkylsuccinic anhydrides such as 3-trimethoxysilylpropylsuccinic anhydride and 3-triethoxysilylpropylsuccinic anhydride; and (methacryloyloxyalkyl)alkoxysilane compounds such as 3-methacryloyloxypropyltrimethoxysilane and 3-methacryloyloxypropyltriethoxysilane.

The alkoxysilyl group-containing compound may also contain a nitrogen atom and a carbonyl group. Examples of the compound containing a nitrogen atom and a carbonyl group as well as an alkoxysilyl group include tris[(alkoxysilyl)alkyl]isocyanurate compounds such as tris[3-(trimethoxysilyl)propyl]isocyanurate, tris[3-(triethoxysilyl)propyl]isocyanurate, tris[3-(tripropoxysilyl)propyl]isocyanurate, and tris[3-(tributoxysilyl)propyl]isocyanurate. Among them, tris[3-(trimethoxysilyl)propyl]isocyanurate is preferred.

The compound containing a nitrogen atom and/or a silicon atom may be an N,N-dialkyl-substituted carboxylic acid amide dialkyl acetal compound. Examples of the N,N-dialkyl-substituted carboxylic acid amide dialkyl acetal compound include N,N-dialkylformamide dialkyl acetals such as N,N-dimethylformamide dimethyl acetal and N,N-diethylformamide dimethyl acetal; N,N-dialkylacetamide dialkyl acetals such as N,N-dimethylacetamide dimethyl acetal and N,N-diethylacetamide dimethyl acetal; and N,N-dialkylpropionamide dialkyl acetals such as N,N-dimethylpropionamide dimethyl acetal and N,N-diethylpropionamide dimethyl acetal. Among them, N,N-dialkylformamide dialkyl acetals are preferred, and N,N-dimethylformamide dimethyl acetal is more preferred.

In the method for producing the conjugated diene polymer, a coupling agent may be added to a solution of the conjugated diene polymer in a hydrocarbon at a time from initiation of the polymerization of monomers until recovery of the polymer described later. The coupling agent may be a compound represented by the following formula (V):

$$R^{51}{}_a ML_{4-a} \quad (V)$$

wherein $R^{51}$ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agent represented by the formula (V) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

For enhancing the processability of the conjugated diene polymer, the amount of the coupling agent to be added per mol of the alkali metal derived from an alkali metal catalyst is preferably not less than 0.03 mol and more preferably not less than 0.05 mol. For enhancing the fuel economy, the amount is preferably not more than 0.4 mol and more preferably not more than 0.3 mol.

In the method for producing the conjugated diene polymer, an unreacted active end of the polymer may be treated with alcohol, such as methanol or isopropyl alcohol, before the recovery of the polymer described later.

The conjugated diene polymer may be recovered from the solution of the conjugated diene polymer in a hydrocarbon by any known method, including, for example, (A) a method of adding a coagulant to the solution of the conjugated diene polymer in a hydrocarbon, and (B) a method of adding steam to the solution of the conjugated diene polymer in a hydrocarbon (steam stripping treatment). The recovered conjugated diene polymer may be dried with a known dryer such as a band dryer or an extrusion dryer.

For enhancing the fuel economy, wet-grip performance, abrasion resistance, and processability in a balanced manner, the amount of the structural unit derived from the polymerization initiator represented by the formula (I) in the conjugated diene polymer is preferably not less than 0.0001 mmol/g polymer, more preferably not less than 0.001 mmol/g polymer, and is also preferably not more than 0.15 mmol/g polymer, and more preferably not more than 0.1 mmol/g polymer, each per polymer unit mass.

For enhancing the fuel economy, wet-grip performance, abrasion resistance, and processability in a balanced manner, the amount of the structural unit derived from the silicon-containing vinyl compound in the conjugated diene polymer is preferably not less than 0.01 mmol/g polymer, more preferably not less than 0.02 mmol/g polymer, and is also preferably not more than 0.4 mmol/g polymer, and more preferably not more than 0.2 mmol/g polymer, each per polymer unit mass.

For enhancing the fuel economy, wet-grip performance, abrasion resistance, and processability in a balanced manner, the conjugated diene polymer preferably contains a structural unit derived from the compound represented by the formula (II). The structural unit derived from the compound represented by the formula (II) in the conjugated diene polymer refers to a structural unit represented by the following formula (IIb):

[Chem. 14]

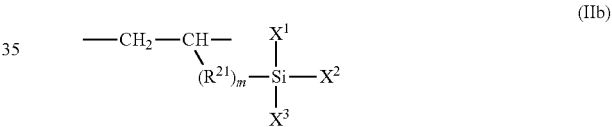

(IIb)

wherein m, $R^{21}$, $X^1$, $X^2$, and $X^3$ are as defined in the formula (II).

In the structural unit derived from the compound represented by the formula (II) in the conjugated diene polymer in the present invention, at least one of $X^1$, $X^2$ and $X^3$, more preferably two or more, still more preferably two of $X^1$, $X^2$ and $X^3$ are preferably replaced by hydroxyl groups. This arrangement enhances the effects of improving the fuel economy, wet-grip performance, abrasion resistance, and processability. Nonlimiting examples of a method for replacing at least one of $X^1$, $X^2$ and $X^3$ with a hydroxyl group include steam stripping treatment.

For enhancing the fuel economy, wet-grip performance, abrasion resistance, and processability in a balanced manner, the conjugated diene polymer preferably contains a structural unit derived from an aromatic vinyl compound (aromatic vinyl unit). If the conjugated diene polymer contains an aromatic vinyl unit, the amount of the aromatic vinyl unit in the conjugated diene polymer, expressed based on the combined amount (100% by mass) of the conjugated diene compound-derived structural unit (conjugated diene unit) and the aromatic vinyl unit, is preferably not less than 10% by mass (the amount of the conjugated diene unit, of the compound, is not more than 90% by mass), and more preferably not less than 15% by mass (the amount of the conjugated diene unit is not more than 85% by mass). Also, from a viewpoint of fuel economy, the amount of the aromatic vinyl unit is preferably not more than 50% by mass (the amount of the conjugated diene unit is not less than 50% by mass), and more preferably not more than 45% by mass (the amount of the conjugated diene unit is not less than 55% by mass).

In the case where the conjugated diene polymer contains an aromatic vinyl compound-derived structural unit, from a viewpoint of fuel economy, the conjugated diene polymer preferably has a vinyl bond content (vinyl content) of not more than 80 mol %, more preferably not more than 70 mol %, based on 100 mol % of the conjugated diene unit content. From a viewpoint of wet-grip performance, the vinyl bond content is preferably not less than 10 mol %, more preferably not less than 15 mol %, still more preferably not less than 20 mol %, and particularly preferably not less than 40 mol %.

Particularly for enhancing the abrasion resistance, the conjugated diene polymer preferably contains no aromatic vinyl compound-derived structural unit. In this case, the conjugated diene polymer preferably has a vinyl bond content (vinyl content) of not more than 20 mol %, more preferably not more than 15 mol %, based on 100 mol % of the conjugated diene unit content.

The vinyl bond content in the conjugated diene polymer can be measured by a method in the examples mentioned below.

For enhancing the fuel economy, the conjugated diene polymer preferably has a molecular weight distribution of 1 to 5, more preferably 1 to 2. The molecular weight distribution is determined by measuring a number average molecular weight (Mn) and a weight average molecular weight (Mw) by a gel permeation chromatography (GPC) method, and dividing Mw by Mn.

The conjugated diene polymer can be used in the rubber component of the rubber composition of the present invention.

The amount of the conjugated diene polymer based on 100% by mass of the rubber component is not more than 90% by mass, preferably not more than 80% by mass, and more preferably not more than 75% by mass. An amount of more than 90% by mass tends to not only decrease the abrasion resistance but also drive up the cost. The amount of the conjugated diene polymer is preferably not less than 5% by mass, more preferably not less than 10% by mass, still more preferably not less than 25% by mass, and particularly preferably not less than 40% by mass. An amount of less than 5% by mass is less likely to provide the effect of improving the fuel economy.

Examples of other rubbers that can be used in the rubber component include conventional rubbers such as styrene-butadiene copolymer rubber (SBR), polybutadiene rubber (BR), butadiene-isoprene copolymer rubber, and butyl rubber. Natural rubber (NR), ethylene-propylene copolymers, ethylene-octene copolymers and the like may also be mentioned. Two or more kinds of such rubbers may be used in combination. From the viewpoint of improving the fuel economy, wet-grip performance, abrasion resistance, and processability in a balanced manner, those containing not less than 50% by mass of a conjugated diene compound-derived structural unit can be suitably used among these. Specifically, NR, BR, SBR, or IR is preferred.

The NR is not particularly limited, and examples thereof include those commonly used in the tire industry, such as SIR20, RSS#3, TSR20, deproteinized natural rubber (DPNR), and highly purified natural rubber (HPNR). Similarly, IRs commonly used in the tire industry may be used.

The BR is not particularly limited, and examples thereof include those commonly used in the tire industry, including, for example, BRs with a high cis content such as BR1220 (ZEON Corporation), and BR130B and BR150B (Ube Industries, Ltd.); and syndiotactic polybutadiene crystal-containing BRs such as VCR412 and VCR617 (Ube Industries, Ltd.).

If the rubber composition of the present invention contains BR, the amount of BR based on 100% by mass of the rubber component is preferably not less than 5% by mass, more preferably not less than 10% by mass, and still more preferably not less than 15% by mass. If the amount is less than 5% by mass, the abrasion resistance tends to decrease. The amount of BR is preferably not more than 60% by mass, and more preferably not more than 50% by mass. If the amount is more than 60% by mass, the wet grip performance tends to decrease.

The SBR is not particularly limited, and examples thereof include those commonly used in the tire industry, such as Nipol NS116R produced by ZEON Corporation.

If the rubber composition of the present invention contains SBR, the amount of SBR based on 100% by mass of the rubber component is preferably not less than 40% by mass, and more preferably not less than 50% by mass. If the amount is less than 40% by mass, the wet-grip performance tends to decrease. The amount of SBR is preferably not more than 90% by mass, and more preferably not more than 80% by mass. If the amount is more than 90% by mass, the fuel economy tends to deteriorate.

The rubber composition of the present invention contains silica. The silica is not particularly limited, and examples thereof include dry silica (anhydrous silica) and wet silica (hydrous silica). Wet silica is preferred because it has more silanol groups. These kinds of silicas may be used alone or in combinations of two or more.

The amount of silica per 100 parts by mass of the rubber component is not less than 10 parts by mass, preferably not less than 30 parts by mass, and more preferably not less than 45 parts by mass. If the amount is less than 10 parts by mass, such addition of silica tends not to produce a sufficient effect, and the abrasion resistance tends to decrease. The amount of silica is not more than 150 parts by mass, and more preferably not more than 100 parts by mass. If the amount exceeds 150 parts by mass, the processability tends to deteriorate.

The silica preferably has a nitrogen adsorption specific surface area ($N_2SA$) of not less than 40 $m^2/g$, more preferably not less than 50 $m^2/g$, and still more preferably not less than 60 $m^2/g$. If the $N_2SA$ is less than 40 $m^2/g$, the silica tends to have little reinforcing effect, and the abrasion resistance and tensile strength at break tend to decrease. The silica preferably has a nitrogen adsorption specific surface area ($N_2SA$) of not more than 400 $m^2/g$, more preferably not more than 360 $m^2/g$, and still more preferably not more than 300 $m^2/g$. Silica having a $N_2SA$ of more than 400 $m^2/g$ tends not to disperse easily, and the fuel economy and processability tend to deteriorate.

The nitrogen adsorption specific surface area of silica is determined by the BET method in accordance with ASTM D3037-81.

The silica may be added together with a silane coupling agent. Examples of silane coupling agents include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazole tetrasulfide, 3-triethoxysilylpropylbenzothiazolyltetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, and dimethoxymethylsilylpropylbenzothiazole tetrasulfide. Preferred among these are bis(3-triethoxysilylpropyl)tetrasulfide and 3-trimethoxysilylpropylbenzothiazolyltetrasulfide from viewpoints of the reinforcement-improving effect and the like. These silane coupling agents may be used alone or in combinations of two or more.

The amount of silane coupling agent per 100 parts by mass of silica is preferably not less than 1 part by mass, and more preferably not less than 2 parts by mass. If the amount is less than 1 part by mass, the resulting unvulcanized rubber composition tends to have high viscosity and thus the processability tends to deteriorate. Also, the amount of silane coupling agent is preferably not more than 20 parts by mass, and more preferably not more than 15 parts by mass. If the amount exceeds 20 parts by mass, the effect commensurate with the cost increase tends not to be obtained.

Known additives may be used, and examples thereof include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organic peroxides; fillers such as carbon black, calcium carbonate, talc, alumina, clay, aluminum hydroxide, and mica; processing aids such as extender oils and lubricants; and antioxidants.

Examples of the carbon black include furnace black (furnace carbon black) such as SAF, ISAF, HAF, MAF, FEF, SRF, GPF, APF, FF, CF, SCF or ECF; acetylene black (acetylene carbon black); thermal black (thermal carbon black) such as FT or MT; channel black (channel carbon black) such as EPC, MPC or CC; and graphite. These may be used alone or in combinations of two or more.

The amount of carbon black per 100 parts by mass of the rubber component is preferably not less than 1 part by mass, and more preferably not less than 3 parts by mass. If the amount is less than 1 part by mass, sufficient reinforcement may not be obtained. Also, the amount of carbon black is preferably not more than 60 parts by mass, more preferably not more than 30 parts by mass, and still more preferably not more than 10 parts by mass. If the amount is more than 60 parts by mass, the fuel economy tends to deteriorate.

The carbon black typically has a nitrogen adsorption specific surface area ($N_2SA$) of 5 to 200 $m^2/g$. Preferably, the lower limit and the upper limit thereof are 50 $m^2/g$ and 150 $m^2/g$, respectively. The carbon black typically has a dibutyl phthalate (DBP) absorption of 5 to 300 mL/100 g. Preferably, the lower limit and the upper limit thereof are 80 mL/100 g and 180 mL/100 g, respectively. If the $N_2SA$ or DBP absorption of carbon black is lower than the range mentioned above, the carbon black tends to have little reinforcing effect, and the abrasion resistance tends to decrease. If the $N_2SA$ or DBP absorption of carbon black is larger than the range mentioned above, the carbon black tends not to disperse well, and the hysteresis loss tends to increase and thus the fuel economy tends to decrease. The nitrogen adsorption specific surface area is measured according to ASTM D4820-93. The DBP absorption is measured according to ASTM D2414-93. Examples of commercially available carbon blacks include SEAST 6, SEAST 7HM, and SEAST KH (trade names) manufactured by Tokai Carbon Co., Ltd.; and CK 3 and Special Black 4A (trade names) manufactured by Evonik Degussa.

Examples of the extender oil include aromatic mineral oils (viscosity gravity constant (V.G.C. value) 0.900 to 1.049), naphthenic mineral oils (V.G.C. value 0.850 to 0.899), and paraffinic mineral oils (V.G.C. value 0.790 to 0.849). The extender oil preferably has a polycyclic aromatic content of less than 3% by mass, more preferably less than 1% by mass. The polycyclic aromatic content is measured according to the IP 346/92 method of the Institute of Petroleum. The extender oil preferably has an aromatic content (CA) of not less than 20% by mass. Two or more of these kinds of extender oils may be used in combination.

Examples of the vulcanization accelerator include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. The amount thereof to be used is preferably 0.1 to 5 parts by mass, and more preferably 0.2 to 3 parts by mass, per 100 parts by mass of the rubber component.

Known methods may be employed for adding other rubbers, additives and the like to the conjugated diene polymer to prepare the rubber composition. For example, a method of kneading components with a known mixer such as a roll mill or a Banbury mixer may be employed.

With regard to the kneading conditions when additives other than vulcanizing agents and vulcanization accelerators are mixed, the kneading temperature is typically 50° C. to 200° C., and preferably 80° C. to 190° C., and the kneading time is typically 30 seconds to 30 minutes, and preferably 1 minute to 30 minutes.

When a vulcanizing agent and/or a vulcanization accelerator are mixed, the kneading temperature is typically not higher than 100° C., and preferably room temperature to 80° C. The composition containing a vulcanizing agent and/or a vulcanization accelerator is typically used after it is vulcanized by press vulcanization or the like. The vulcanization temperature is typically 120° C. to 200° C., and preferably 140° C. to 180° C.

The rubber composition of the present invention is excellent in the balance among fuel economy, wet-grip performance, abrasion resistance, and processability, and is effective in significantly improving these properties.

The rubber composition of the present invention can be suitably used for various components of a tire, especially suitably in a tread.

The pneumatic tire of the present invention can be prepared using the rubber composition by an ordinary method. Specifically, before vulcanization, the rubber composition to which various additives are optionally added is extruded and processed into the shape of a tire component (e.g., tread), and then arranged in a usual manner on a tire building machine and assembled with other tire components to build an unvulcanized tire. Then, the unvulcanized tire is heated and pressed in a vulcanizer into the tire.

The pneumatic tire of the present invention can be suitably used for passenger vehicles.

EXAMPLES

The present invention is more specifically described with reference to examples. However, the present invention is not limited to the examples.

The following is a list of chemical agents used in the synthesis or polymerization. The chemical agents were purified as needed by usual methods.
THF: anhydrous tetrahydrofuran, product of Kanto Chemical Co., Inc.
Sodium hydride: product of Kanto Chemical Co., Inc.
Diethylamine: product of Kanto Chemical Co., Inc.
Methylvinyldichlorosilane: product of Shin-Etsu Chemical Co., Ltd.
Anhydrous hexane: product of Kanto Chemical Co., Inc.
Styrene: product of Kanto Chemical Co., Inc.
Butadiene: 1,3-butadiene, product of Tokyo Chemical Industry Co., Ltd.
TMEDA: tetramethylethylenediamine, product of Kanto Chemical Co., Inc.
n-Butyllithium solution: 1.6M n-butyllithium in hexane, product of Kanto Chemical Co., Inc.
Initiator (1): AI-200CE2, product of FMC (compound in which 3-(N,N-dimethylamino)-1-propyllithium is linked to two isoprene-derived structural units, represented by the following formula) (0.9M)

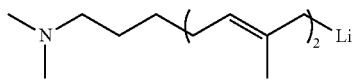

[Chem. 15]

Piperidine: product of Tokyo Chemical Industry Co., Ltd.
Diamylamine: product of Tokyo Chemical Industry Co., Ltd.
2,6-di-tert-butyl-p-cresol: Nocrac 200, product of Ouchi Shinko Chemical Industrial Co., Ltd.
Bis(dimethylamino)methylvinylsilane: product of Shin-Etsu Chemical Co., Ltd.
N,N-dimethylaminopropylacrylamide: product of Tokyo Chemical Industry Co., Ltd.
3-diethylaminopropyltriethoxysilane: product of Azmax
1,3-dimethyl-2-imidazolidinone: product of Tokyo Chemical Industry Co., Ltd.
N-phenyl-2-pyrrolidone: product of Tokyo Chemical Industry Co., Ltd.
N-methyl-ε-caprolactam: product of Tokyo Chemical Industry Co., Ltd.
Tris[3-(trimethoxysilyl)propyl]isocyanurate: product of Shin-Etsu Chemical Co., Ltd.
N,N-dimethylformamide dimethyl acetal: product of Tokyo Chemical Industry Co., Ltd.
1,3-diisopropenylbenzene: product of Tokyo Chemical Industry Co., Ltd.
sec-Butyllithium solution: product of Kanto Chemical Co., Inc. (1.0 mol/L)
Cyclohexane: product of Kanto Chemical Co., Inc.

<Preparation of Modifier (1) (Main Chain Modifier)>
In a nitrogen atmosphere, 15.8 g of bis(dimethylamino) methylvinylsilane was charged into a 100-mL volumetric flask, and anhydrous hexane was then added to increase the total amount to 100 mL. In this manner, a modifier (1) was prepared.

<Preparation of Modifier (2) (Chain-End Modifier)>
In a nitrogen atmosphere, 15.6 g of N,N-dimethylaminopropylacrylamide was charged into a 100-mL volumetric flask, and anhydrous hexane was then added to increase the total amount to 100 mL. In this manner, a modifier (2) was prepared.

<Preparation of Modifier (3) (Main Chain Modifier)>
THF (1000 mL) and sodium hydride (13 g) were charged into a sufficiently nitrogen-purged 2-L three-necked flask, and diethylamine (36.5 g) was slowly added dropwise thereto on an ice water bath while stirring. After stirring for 30 minutes, methylvinyldichlorosilane (36 g) was added dropwise over 30 minutes, followed by stirring for 2 hours. The resulting solution was concentrated, filtered, and purified by distillation under reduced pressure to synthesize bis(diethylamino)methylvinylsilane. The bis(diethylamino)methylvinylsilane (21.4 g) was charged into a 100-mL volumetric flask in a nitrogen atmosphere, and anhydrous hexane was then added to increase the total amount to 100 mL.

<Preparation of Initiator (2)>
Anhydrous hexane (127.6 mL) and piperidine (8.5 g) were charged into a sufficiently nitrogen-purged 200-mL recovery flask, and cooled to 0° C. Then, an n-butyllithium solution (62.5 mL) was slowly added over 1 hour to give an initiator (2).

<Preparation of Initiator (3)>
Anhydrous hexane (117 mL) and diamylamine (15.7 g) were charged into a sufficiently nitrogen-purged 200-mL recovery flask, and cooled to 0° C. Then, an n-butyllithium solution (62.5 mL) was slowly added over 1 hour to give an initiator (3).

<Preparation of Modifier (4) (Chain-End Modifier)>
In a nitrogen atmosphere, 3-diethylaminopropyltriethoxysilane (27.7 g) was charged into a 100-mL volumetric flask, and then anhydrous hexane was added to increase the total amount to 100 mL. In this manner, a modifier (4) was prepared.

<Preparation of Initiator (4) (Bifunctional Initiator)>
Cyclohexane (550 mL), TMEDA (27 mL), and a sec-butyllithium solution (200 mL) were charged into a sufficiently dried and nitrogen-purged 1-L recovery flask. While the mixture was stirred at 45° C., 1,3-diisopropenylbenzene (17 mL) was slowly added thereto over 30 minutes. The resulting mixture was stirred for another one hour, and then cooled to room temperature to give an initiator (4).

<Preparation of Modifier (5) (Chain-End Modifier)>
In a nitrogen atmosphere, 1,3-dimethyl-2-imidazolidinone (11.4 g) was charged into a 100-mL volumetric flask, and then anhydrous hexane was added to increase the total amount to 100 mL. In this manner, a modifier (5) was prepared.

<Preparation of Modifier (6) (Chain-End Modifier)>
In a nitrogen atmosphere, N-phenyl-2-pyrrolidone (16.1 g) was charged into a 100-mL volumetric flask, and then anhydrous hexane was added to increase the total amount to 100 mL. In this manner, a modifier (6) was prepared.

<Preparation of Modifier (7) (Chain-End Modifier)>
In a nitrogen atmosphere, N-methyl-ε-caprolactam (12.7 g) was charged into a 100-mL volumetric flask, and then anhydrous hexane was added to increase the total amount to 100 mL. In this manner, a modifier (7) was prepared.

<Preparation of Modifier (8) (Chain-End Modifier)>
In a nitrogen atmosphere, tris[3-(trimethoxysilyl)propyl] isocyanurate (30.7 g) was charged into a 100-mL volumetric flask, and then anhydrous hexane was added to increase the total amount to 200 mL. In this manner, a modifier (8) was prepared.

<Preparation of Modifier (9) (Chain-End Modifier)>

In a nitrogen atmosphere, N,N-dimethylformamide dimethyl acetal (11.9 g) was charged into a 100-mL volumetric flask, and then anhydrous hexane was added to increase the total amount to 200 mL. In this manner, a modifier (9) was prepared.

<Copolymer Analysis>

Copolymers (conjugated diene polymers) obtained as mentioned below were analyzed by the following methods.

<Measurement of Weight Average Molecular Weight (Mw) and Number Average Molecular Weight (Mn)>

The weight average molecular weight (Mw) and number average molecular weight (Mn) of each copolymer were measured by a gel permeation chromatograph (GPC) (GPC-8000 series, product of Tosoh Corporation; detector: differential refractometer; column: TSKGEL SUPERMULTIPORE HX-M, product of Tosoh Corporation) and expressed as polystyrene-equivalent values. A molecular weight distribution Mw/Mn was calculated from the measurement results.

<Structural Identification of Copolymers>

The structure (styrene content, vinyl content) of each copolymer was identified with a device of JNM-ECA series produced by JEOL Ltd. Each polymer (0.1 g) was dissolved in toluene (15 mL), and the solution was slowly introduced into methanol (30 mL) for reprecipitation. The resulting precipitate was dried under reduced pressure, and then measured.

<Synthesis of Copolymer (1)>

N-hexane (18 L), styrene (600 g), butadiene (1400 g), the modifier (1) (40 mL), and TMEDA (10 mmol) were charged into a sufficiently nitrogen-purged 30-L pressure resistant container, and heated to 40° C. After further addition of the initiator (2) (34 mL), the mixture was heated to 50° C., and stirred for 3 hours. Next, the modifier (2) (20 mL) was added, followed by stirring for 30 minutes. The reaction solution was mixed with methanol (15 mL) and 2,6-tert-butyl-p-cresol (0.1 g). Thereafter, a coagulum was recovered from the polymer solution by steam stripping treatment, and the coagulum was dried under reduced pressure for 24 hours to give a copolymer (1). It should be noted that 0.32 g of the silicon-containing vinyl compound (modifier (1)) was introduced per 100 g of the monomer component; 0.85 mmol of the polymerization initiator (initiator (2)) was introduced per 100 g of the monomer component; and 1.18 mol of the compound (modifier (2)) containing a nitrogen atom and/or a silicon atom was introduced per mol of the alkali metal derived from the polymerization initiator introduced.

<Synthesis of Copolymer (2)>

A copolymer (2) was prepared using the same procedure as in the synthesis of the copolymer (1), except that the initiator (3) (34 mL) was used instead of the initiator (2) (34 mL). It should be noted that 0.32 g of the silicon-containing vinyl compound (modifier (1)) was introduced per 100 g of the monomer component; 0.85 mmol of the polymerization initiator (initiator (3)) was introduced per 100 g of the monomer component; and 1.18 mol of the compound (modifier (2)) containing a nitrogen atom and/or a silicon atom was introduced per mol of the alkali metal derived from the polymerization initiator introduced.

<Synthesis of Copolymer (3)>

A copolymer (3) was prepared using the same procedure as in the synthesis of the copolymer (1), except that the amounts of styrene and butadiene were changed to 900 g and 1100 g, respectively. It should be noted that 0.32 g of the silicon-containing vinyl compound (modifier (1)) was introduced per 100 g of the monomer component; 0.85 mmol of the polymerization initiator (initiator (2)) was introduced per 100 g of the monomer component; and 1.18 mol of the compound (modifier (2)) containing a nitrogen atom and/or a silicon atom was introduced per mol of the alkali metal derived from the polymerization initiator introduced.

<Synthesis of Copolymer (4)>

A copolymer (4) was prepared using the same procedure as in the synthesis of the copolymer (1), except that the initiator (1) (19 mL) was used instead of the initiator (2) (34 mL). It should be noted that 0.32 g of the silicon-containing vinyl compound (modifier (1)) was introduced per 100 g of the monomer component; 0.85 mmol of the polymerization initiator (initiator (1)) was introduced per 100 g of the monomer component; and 1.18 mol of the compound (modifier (2)) containing a nitrogen atom and/or a silicon atom was introduced per mol of the alkali metal derived from the polymerization initiator introduced.

<Synthesis of Copolymer (5)>

N-hexane (18 L), styrene (600 g), butadiene (1400 g), the modifier (1) (75 mL), and TMEDA (10 mmol) were charged into a sufficiently nitrogen-purged 30-L pressure resistant container, and heated to 40° C. After further addition of the initiator (1) (19 mL), the mixture was heated to 50° C., and stirred for 30 minutes. Then, the modifier (1) (75 mL) was further added, and the mixture was stirred for 2.5 hours. Next, the modifier (2) (20 mL) was added, followed by stirring for 30 minutes. The reaction solution was mixed with methanol (1 mL) and 2,6-tert-butyl-p-cresol (0.1 g). Thereafter, a coagulum was recovered from the polymer solution by steam stripping treatment, and the coagulum was dried under reduced pressure for 24 hours to give a copolymer (5). It should be noted that 1.19 g of the silicon-containing vinyl compound (modifier (1)) was introduced per 100 g of the monomer component; 0.85 mmol of the polymerization initiator (initiator (1)) was introduced per 100 g of the monomer component; and 1.18 mol of the compound (modifier (2)) containing a nitrogen atom and/or a silicon atom was introduced per mol of the alkali metal derived from the polymerization initiator introduced.

<Synthesis of Copolymer (6)>

A copolymer (6) was prepared using the same procedure as in the synthesis of the copolymer (4), except that the amounts of styrene and butadiene were changed to 0 g and 2000 g, respectively; THF (5 mmol) was used instead of TMEDA (10 mmol); and the initiator (1) (23 mL) was used instead of the initiator (1) (19 mL). It should be noted that 0.32 g of the silicon-containing vinyl compound (modifier (1)) was introduced per 100 g of the monomer component; 1.05 mmol of the polymerization initiator (initiator (1)) was introduced per 100 g of the monomer component; and 0.95 mol of the compound (modifier (2)) containing a nitrogen atom and/or a silicon atom was introduced per mol of the alkali metal derived from the polymerization initiator introduced.

<Synthesis of Copolymer (7)>

A copolymer (7) was prepared using the same procedure as in the synthesis of the copolymer (4), except that the modifier (3) (40 mL) was used instead of the modifier (1) (40 mL). It should be noted that 0.43 g of the silicon-containing vinyl compound (modifier (3)) was introduced per 100 g of the monomer component; 0.85 mmol of the polymerization initiator (initiator (1)) was introduced per 100 g of the monomer component; and 1.18 mol of the compound (modifier (2)) containing a nitrogen atom and/or a silicon atom was introduced per mol of the alkali metal derived from the polymerization initiator introduced.

<Synthesis of Copolymer (8)>

A copolymer (8) was prepared using the same procedure as in the synthesis of the copolymer (7), except that an n-butyllithium solution (10.6 mL) was used instead of the initiator (1) (19 mL). It should be noted that 0.43 g of the silicon-containing vinyl compound (modifier (3)) was introduced per 100 g of the monomer component; and 1.18 mol of the compound (modifier (2)) containing a nitrogen atom and/or a silicon atom was introduced per mol of the alkali metal derived from the polymerization initiator introduced.

<Synthesis of Copolymer (9)>

A copolymer (9) was prepared using the same procedure as in the synthesis of the copolymer (6), except that an n-butyllithium solution (13 mL) was used instead of the initiator (1) (23 mL). It should be noted that 0.43 g of the silicon-containing vinyl compound (modifier (1)) was introduced per 100 g of the monomer component; and 0.95 mol of the compound (modifier (2)) containing a nitrogen atom and/or a silicon atom was introduced per mol of the alkali metal derived from the polymerization initiator introduced.

<Synthesis of Copolymer (10)>

A copolymer (10) was prepared using the same procedure as in the synthesis of the copolymer (1), except that the amount of the modifier (1) was changed from 40 mL to 0 mL. 0.85 mmol of the polymerization initiator (initiator (2)) was introduced per 100 g of the monomer component; and 1.18 mol of the compound (modifier (2)) containing a nitrogen atom and/or a silicon atom was introduced per mol of the alkali metal derived from the polymerization initiator introduced.

<Synthesis of Copolymer (11)>

A copolymer (11) was prepared using the same procedure as in the synthesis of the copolymer (1), except that the amount of the modifier (2) was changed from 20 mL to 0 mL. It should be noted that 0.32 g of the silicon-containing vinyl compound (modifier (1)) was introduced per 100 g of the monomer component; and 0.85 mmol of the polymerization initiator (initiator (2)) was introduced per 100 g of the monomer component.

<Synthesis of Copolymer (12)>

N-hexane (18 L), styrene (600 g), butadiene (1400 g), and TMEDA (10 mmol) were charged into a sufficiently nitrogen-purged 30-L pressure resistant container, and heated to 40° C. After further addition of an n-butyllithium solution (11 mL), the mixture was heated to 50° C., and stirred for 3 hours. Next, the reaction solution was mixed with methanol (1 mL) and 2,6-tert-butyl-p-cresol (0.1 g). Then, a coagulum was recovered from the polymer solution by steam stripping treatment, and the coagulum was dried under reduced pressure for 24 hours to give a copolymer (12).

<Synthesis of Copolymer (13)>

A copolymer (13) was prepared using the same procedure as in the synthesis of the copolymer (7), except that a coagulum was recovered from the polymer solution not by steam stripping treatment but by evaporating the polymer solution at ordinary temperatures for 24 hours, followed by drying under reduced pressure. It should be noted that 0.43 g of the silicon-containing vinyl compound (modifier (3)) was introduced per 100 g of the monomer component; 0.85 mmol of the polymerization initiator (initiator (1)) was introduced per 100 g of the monomer component; and 1.18 mol of the compound (modifier (2)) containing a nitrogen atom and/or a silicon atom was introduced per mol of the alkali metal derived from the polymerization initiator introduced.

<Synthesis of Copolymer (14)>

A copolymer (14) was prepared using the same procedure as in the synthesis of the copolymer (7), except that the amounts of the modifier (3) (40 mL) and the modifier (2) (20 mL) were each changed to 0 mL. It should be noted that 8.5 mmol of the polymerization initiator (initiator (1)) was introduced per 100 g of the monomer component.

<Synthesis of Copolymer (15)>

A copolymer (15) was prepared using the same procedure as in the synthesis of the copolymer (7), except that an n-butyllithium solution (6.8 mL) was used instead of the initiator (1) (19 mL), and the amount of the modifier (2) was changed from 20 mL to 0 mL. It should be noted that 0.43 g of the silicon-containing vinyl compound (modifier (3)) was introduced per 100 g of the monomer component.

<Synthesis of Copolymer (16)>

A copolymer (16) was prepared using the same procedure as in the synthesis of the copolymer (7), except that an n-butyllithium solution (6.8 mL) was used instead of the initiator (1) (19 mL), and the amount of the modifier (3) was changed from 40 mL to 0 mL. It should be noted that 1.18 mol of the compound (modifier (2)) containing a nitrogen atom and/or a silicon atom was introduced per mol of the alkali metal derived from the polymerization initiator introduced.

<Synthesis of Copolymer (17)>

A copolymer (17) was prepared using the same procedure as in the synthesis of the copolymer (1), except that the initiator (4) (bifunctional initiator, 68 mL) was used instead of the initiator (2) (34 mL), and the amount of the modifier (2) was changed from 20 mL to 40 mL. It should be noted that 0.32 g of the silicon-containing vinyl compound (modifier (1)) was introduced per 100 g of the monomer component; and 2.28 mol (1.14 mol for each end) of the compound (modifier (2)) containing a nitrogen atom and/or a silicon atom was introduced per mol of the alkali metal derived from the polymerization initiator introduced.

<Synthesis of Copolymer (18)>

A copolymer (18) was prepared using the same procedure as in the synthesis of the copolymer (1), except that the modifier (4) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (2)) was introduced per 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (19)>

A copolymer (19) was prepared using the same procedure as in the synthesis of the copolymer (2), except that the modifier (4) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (3)) was introduced per 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (20)>

A copolymer (20) was prepared using the same procedure as in the synthesis of the copolymer (3), except that the modifier (4) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (2)) was introduced per 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (21)>

A copolymer (21) was prepared using the same procedure as in the synthesis of the copolymer (4), except that the modifier (4) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (1)) was introduced per 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (22)>

A copolymer (22) was prepared using the same procedure as in the synthesis of the copolymer (5), except that the modifier (4) (20 mL) was used instead of the modifier (2) (20 mL). It should be noted that 1.19 g of the silicon-containing vinyl compound (modifier (1)) was introduced per 100 g of the monomer component; 0.85 mmol of the polymerization initiator (initiator (1)) was introduced per 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (23)>

A copolymer (23) was prepared using the same procedure as in the synthesis of the copolymer (6), except that the modifier (4) (20 mL) was used instead of the modifier (2) (20 mL). It should be noted that 0.32 g of the silicon-containing vinyl compound (modifier (1)) was introduced per 100 g of the monomer component; 1.05 mmol of the polymerization initiator (initiator (1)) was introduced per 100 g of the monomer component; and 0.95 mol of the compound (modifier (4)) containing a nitrogen atom and/or a silicon atom was introduced per mol of the alkali metal derived from the polymerization initiator introduced.

<Synthesis of Copolymer (24)>

A copolymer (24) was prepared using the same procedure as in the synthesis of the copolymer (7), except that the modifier (4) (20 mL) was used instead of the modifier (2) (20 mL). It should be noted that 0.32 g of the silicon-containing vinyl compound (modifier (3)) was introduced per 100 g of the monomer component; 0.85 mmol of the polymerization initiator (initiator (1)) was introduced per 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (25)>

A copolymer (25) was prepared using the same procedure as in the synthesis of the copolymer (24), except that a coagulum was recovered from the polymer solution not by steam stripping treatment but by evaporating the polymer solution at ordinary temperatures for 24 hours, followed by drying under reduced pressure. It should be noted that 0.32 g of the silicon-containing vinyl compound (modifier (3)) was introduced per 100 g of the monomer component; 0.85 mmol of the polymerization initiator (initiator (1)) was introduced per 100 g of the monomer component; and 1.18 mol of the compound (modifier (4)) containing a nitrogen atom and/or a silicon atom was introduced per mol of the alkali metal derived from the polymerization initiator introduced.

<Synthesis of Copolymer (26)>

A copolymer (26) was prepared using the same procedure as in the synthesis of the copolymer (24), except that an n-butyllithium solution (10.6 mL) was used instead of the initiator (1) (19 mL), and the amount of the modifier (3) was changed from 40 mL to 0 mL. It should be noted that 1.18 mol of the compound (modifier (4)) containing a nitrogen atom and/or a silicon atom was introduced per mol of the alkali metal derived from the polymerization initiator introduced.

<Synthesis of Copolymer (27)>

A copolymer (27) was prepared using the same procedure as in the synthesis of the copolymer (1), except that the modifier (5) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (2)) was introduced per 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (28)>

A copolymer (28) was prepared using the same procedure as in the synthesis of the copolymer (2), except that the modifier (5) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (3)) was introduced per 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (29)>

A copolymer (29) was prepared using the same procedure as in the synthesis of the copolymer (3), except that the modifier (5) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (2)) was introduced per 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (30)>

A copolymer (30) was prepared using the same procedure as in the synthesis of the copolymer (4), except that the modifier (5) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (1)) was introduced per 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (31)>

A copolymer (31) was prepared using the same procedure as in the synthesis of the copolymer (5), except that the modifier (5) (20 mL) was used instead of the modifier (2) (20 mL). It should be noted that 1.19 g of the silicon-containing vinyl compound (modifier (1)) was introduced per 100 g of the monomer component; 0.85 mmol of the polymerization initiator (initiator (1)) was introduced per 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (32)>

A copolymer (32) was prepared using the same procedure as in the synthesis of the copolymer (6), except that the modifier (5) (20 mL) was used instead of the modifier (2) (20 mL). It should be noted that 0.32 g of the silicon-containing vinyl compound (modifier (1)) was introduced per 100 g of the monomer component; 1.05 mmol of the polymerization initiator (initiator (1)) was introduced per 100 g of the monomer component; and 0.95 mol of the compound (modifier (5)) containing a nitrogen atom and/or a silicon atom was introduced per mol of the alkali metal derived from the polymerization initiator introduced.

<Synthesis of Copolymer (33)>

A copolymer (33) was prepared using the same procedure as in the synthesis of the copolymer (7), except that the modifier (5) (20 mL) was used instead of the modifier (2) (20 mL). It should be noted that 0.32 g of the silicon-containing vinyl compound (modifier (3)) was introduced per 100 g of the monomer component; 0.85 mmol of the polymerization initiator (initiator (1)) was introduced per 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (34)>

A copolymer (34) was prepared using the same procedure as in the synthesis of the copolymer (33), except that a coagulum was recovered from the polymer solution not by steam stripping treatment but by evaporating the polymer solution at ordinary temperatures for 24 hours, followed by drying under reduced pressure. It should be noted that 0.32 g of the silicon-containing vinyl compound (modifier (3)) was introduced per 100 g of the monomer component; 0.85 mmol of the polymerization initiator (initiator (1)) was introduced per 100 g of the monomer component; and 1.18 mol of the compound (modifier (5)) containing a nitrogen atom and/or a silicon atom was introduced per mol of the alkali metal derived from the polymerization initiator introduced.

<Synthesis of Copolymer (35)>

A copolymer (35) was prepared using the same procedure as in the synthesis of the copolymer (7), except that the modifier (6) (20 mL) was used instead of the modifier (2) (20 mL). It should be noted that 0.32 g of the silicon-containing vinyl compound (modifier (3)) was introduced per 100 g of the monomer component; 0.85 mmol of the polymerization initiator (initiator (1)) was introduced per 100 g of the monomer component; and 1.18 mol of the compound (modifier (6)) containing a nitrogen atom and/or a silicon atom was introduced per mol of the alkali metal derived from the polymerization initiator introduced.

<Synthesis of Copolymer (36)>

A copolymer (36) was prepared using the same procedure as in the synthesis of the copolymer (7), except that the modifier (7) (20 mL) was used instead of the modifier (2) (20 mL). It should be noted that 0.32 g of the silicon-containing vinyl compound (modifier (3)) was introduced per 100 g of the monomer component; 0.85 mmol of the polymerization initiator (initiator (1)) was introduced per 100 g of the monomer component; and 1.18 mol of the compound (modifier (7)) containing a nitrogen atom and/or a silicon atom was introduced per mol of the alkali metal derived from the polymerization initiator introduced.

<Synthesis of Copolymer (37)>

A copolymer (37) was prepared using the same procedure as in the synthesis of the copolymer (33), except that a butyllithium solution (10.6 mL) was used instead of the initiator (1) (19 mL), and the amount of the modifier (3) was changed from 40 mL to 0 mL. It should be noted that 1.18 mol of the compound (modifier (5)) containing a nitrogen atom and/or a silicon atom was introduced per mol of the alkali metal derived from the polymerization initiator introduced.

<Synthesis of Copolymer (38)>

A copolymer (38) was prepared using the same procedure as in the synthesis of the copolymer (1), except that the modifier (8) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (2)) was introduced per 100 g of the monomer component; and 1.18 mol of the compound (modifier (8)) containing a nitrogen atom and/or a silicon atom was introduced per mol of the alkali metal derived from the polymerization initiator introduced.

<Synthesis of Copolymer (39)>

A copolymer (39) was prepared using the same procedure as in the synthesis of the copolymer (2), except that the modifier (8) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (3)) was introduced per 100 g of the monomer component; and 1.18 mol of the compound (modifier (8)) containing a nitrogen atom and/or a silicon atom was introduced per mol of the alkali metal derived from the polymerization initiator introduced.

<Synthesis of Copolymer (40)>

A copolymer (40) was prepared using the same procedure as in the synthesis of the copolymer (3), except that the modifier (8) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (2)) was introduced per 100 g of the monomer component; and 1.18 mol of the compound (modifier (8)) containing a nitrogen atom and/or a silicon atom was introduced per mol of the alkali metal derived from the polymerization initiator introduced.

<Synthesis of Copolymer (41)>

A copolymer (41) was prepared using the same procedure as in the synthesis of the copolymer (4), except that the modifier (8) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (1)) was introduced per 100 g of the monomer component; and 1.18 mol of the compound (modifier (8)) containing a nitrogen atom and/or a silicon atom was introduced per mol of the alkali metal derived from the polymerization initiator introduced.

<Synthesis of Copolymer (42)>

A copolymer (42) was prepared using the same procedure as in the synthesis of the copolymer (5), except that the modifier (8) (20 mL) was used instead of the modifier (2) (20 mL). It should be noted that 1.19 g of the silicon-containing vinyl compound (modifier (1)) was introduced per 100 g of the monomer component; 0.85 mmol of the polymerization initiator (initiator (1)) was introduced per 100 g of the monomer component; and 1.18 mol of the compound (modifier (8)) containing a nitrogen atom and/or a silicon atom was introduced per mol of the alkali metal derived from the polymerization initiator introduced.

<Synthesis of Copolymer (43)>

A copolymer (43) was prepared using the same procedure as in the synthesis of the copolymer (6), except that the modifier (8) (20 mL) was used instead of the modifier (2) (20 mL). It should be noted that 0.32 g of the silicon-containing vinyl compound (modifier (1)) was introduced per 100 g of the monomer component; 1.05 mmol of the polymerization initiator (initiator (1)) was introduced per 100 g of the monomer component; and 0.95 mol of the compound (modifier (8)) containing a nitrogen atom and/or a silicon atom was introduced per mol of the alkali metal derived from the polymerization initiator introduced.

<Synthesis of Copolymer (44)>

A copolymer (44) was prepared using the same procedure as in the synthesis of the copolymer (7), except that the modifier (8) (20 mL) was used instead of the modifier (2) (20 mL). It should be noted that 0.32 g of the silicon-containing vinyl compound (modifier (3)) was introduced per 100 g of the monomer component; 0.85 mmol of the polymerization initiator (initiator (1)) was introduced per 100 g of the monomer component; and 1.18 mol of the compound (modifier (8)) containing a nitrogen atom and/or a silicon atom was introduced per mol of the alkali metal derived from the polymerization initiator introduced.

<Synthesis of Copolymer (45)>

A copolymer (45) was prepared using the same procedure as in the synthesis of the copolymer (44), except that a coagulum was recovered from the polymer solution not by steam stripping treatment but by evaporating the polymer solution at ordinary temperatures for 24 hours, followed by drying under reduced pressure. It should be noted that 0.32 g of the silicon-containing vinyl compound (modifier (3)) was introduced per 100 g of the monomer component; 0.85 mmol of the polymerization initiator (initiator (1)) was introduced per 100 g of the monomer component; and 1.18 mol of the compound (modifier (8)) containing a nitrogen atom and/or a silicon atom was introduced per mol of the alkali metal derived from the polymerization initiator introduced.

<Synthesis of Copolymer (46)>

A copolymer (46) was prepared using the same procedure as in the synthesis of the copolymer (44), except that a butyllithium solution (10.6 mL) was used instead of the initiator (1) (19 mL), and the amount of the modifier (3) was changed from 40 mL to 0 mL. It should be noted that 1.18 mol of the compound (modifier (8)) containing a nitrogen atom and/or a silicon atom was introduced per mol of the alkali metal derived from the polymerization initiator introduced.

<Synthesis of Copolymer (47)>

A copolymer (47) was prepared using the same procedure as in the synthesis of the copolymer (1), except that the modifier (9) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (2)) was introduced per 100 g of the monomer component; and 1.18 mol of the compound (modifier (9)) containing a nitrogen atom and/or a silicon atom was introduced per mol of the alkali metal derived from the polymerization initiator introduced.

<Synthesis of Copolymer (48)>

A copolymer (48) was prepared using the same procedure as in the synthesis of the copolymer (2), except that the modifier (9) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (3)) was introduced per 100 g of the monomer component; and 1.18 mol of the compound (modifier (9)) containing a nitrogen atom and/or a silicon atom was introduced per mol of the alkali metal derived from the polymerization initiator introduced.

<Synthesis of Copolymer (49)>

A copolymer (49) was prepared using the same procedure as in the synthesis of the copolymer (3), except that the modifier (9) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (2)) was introduced per 100 g of the monomer component; and 1.18 mol of the compound (modifier (9)) containing a nitrogen atom and/or a silicon atom was introduced per mol of the alkali metal derived from the polymerization initiator introduced.

<Synthesis of Copolymer (50)>

A copolymer (50) was prepared using the same procedure as in the synthesis of the copolymer (4), except that the modifier (9) (20 mL) was used instead of the modifier (2) (20 mL). It should be noted that 0.32 g of the silicon-containing vinyl compound (modifier (1)) was introduced per 100 g of the monomer component; 0.85 mmol of the polymerization initiator (initiator (1)) was introduced per 100 g of the monomer component; and 1.18 mol of the compound (modifier (9)) containing a nitrogen atom and/or a silicon atom was introduced per mol of the alkali metal derived from the polymerization initiator introduced.

<Synthesis of Copolymer (51)>

A copolymer (51) was prepared using the same procedure as in the synthesis of the copolymer (5), except that the modifier (9) (20 mL) was used instead of the modifier (2) (20 mL). It should be noted that 1.19 g of the silicon-containing vinyl compound (modifier (1)) was introduced per 100 g of the monomer component; 0.85 mmol of the polymerization initiator (initiator (1)) was introduced per 100 g of the monomer component; and 1.18 mol of the compound (modifier (9)) containing a nitrogen atom and/or a silicon atom was introduced per mol of the alkali metal derived from the polymerization initiator introduced.

<Synthesis of Copolymer (52)>

A copolymer (52) was prepared using the same procedure as in the synthesis of the copolymer (6), except that the modifier (9) (20 mL) was used instead of the modifier (2) (20 mL). It should be noted that 0.32 g of the silicon-containing vinyl compound (modifier (1)) was introduced per 100 g of the monomer component; 1.05 mmol of the polymerization initiator (initiator (1)) was introduced per 100 g of the monomer component; and 0.95 mol of the compound (modifier (9)) containing a nitrogen atom and/or a silicon atom was introduced per mol of the alkali metal derived from the polymerization initiator introduced.

<Synthesis of Copolymer (53)>

A copolymer (53) was prepared using the same procedure as in the synthesis of the copolymer (7), except that the modifier (9) (20 mL) was used instead of the modifier (2) (20 mL). It should be noted that 0.32 g of the silicon-containing vinyl compound (modifier (3)) was introduced per 100 g of the monomer component; 0.85 mmol of the polymerization initiator (initiator (1)) was introduced per 100 g of the monomer component; and 1.18 mol of the compound (modifier (9)) containing a nitrogen atom and/or a silicon atom was introduced per mol of the alkali metal derived from the polymerization initiator introduced.

<Synthesis of Copolymer (54)>

A copolymer (54) was prepared using the same procedure as in the synthesis of the copolymer (53), except that a coagulum was recovered from the polymer solution not by steam stripping treatment but by evaporating the polymer solution at ordinary temperatures for 24 hours, followed by drying under reduced pressure. It should be noted that 0.32 g of the silicon-containing vinyl compound (modifier (3)) was introduced per 100 g of the monomer component; 0.85 mmol of the polymerization initiator (initiator (1)) was introduced per 100 g of the monomer component; and 1.18 mol of the compound (modifier (9)) containing a nitrogen atom and/or a silicon atom was introduced per mol of the alkali metal derived from the polymerization initiator introduced.

<Synthesis of Copolymer (55)>

A copolymer (55) was prepared using the same procedure as in the synthesis of the copolymer (53), except that a butyllithium solution (10.6 mL) was used instead of the initiator (1) (19 mL), and the amount of the modifier (3) was changed from 40 mL to 0 mL. It should be noted that 1.18 mol of the compound (modifier (9)) containing a nitrogen atom and/or a silicon atom was introduced per mol of the alkali metal derived from the polymerization initiator introduced.

Tables 1 to 5 summarize the properties (e.g. the monomer component) of the copolymers (1) to (55).

TABLE 1

Examples in which a compound represented by the formula (IIId) is used as a chain-end modifier

| Copolymer | Initiator | Monomer component | Chain-end modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (1) | Initiator (2) | styrene, 1,3-butadiene, Modifier (1) | Modifier (2) | 30 | 56 | 1.21 | 26.5 |
| Copolymer (2) | Initiator (3) | styrene, 1,3-butadiene, Modifier (1) | Modifier (2) | 30 | 57 | 1.23 | 26.8 |
| Copolymer (3) | Initiator (2) | styrene, 1,3-butadiene, Modifier (1) | Modifier (2) | 45 | 56 | 1.23 | 26.9 |
| Copolymer (4) | Initiator (1) | styrene, 1,3-butadiene, Modifier (1) | Modifier (2) | 30 | 56 | 1.13 | 24.8 |
| Copolymer (5) | Initiator (1) | styrene, 1,3-butadiene, Modifier (1) | Modifier (2) | 30 | 56 | 1.20 | 27.1 |
| Copolymer (6) | Initiator (1) | 1,3-butadiene, Modifier (1) | Modifier (2) | 0 | 14.2 | 1.17 | 28.9 |
| Copolymer (7) | Initiator (1) | styrene, 1,3-butadiene, Modifier (3) | Modifier (2) | 30 | 56 | 1.18 | 26.0 |
| Copolymer (8) | n-butyllithium solution | styrene, 1,3-butadiene, Modifier (3) | Modifier (2) | 30 | 55 | 1.17 | 24.5 |
| Copolymer (9) | n-butyllithium solution | 1,3-butadiene, Modifier (1) | Modifier (2) | 0 | 13.5 | 1.16 | 29.3 |
| Copolymer (10) | Initiator (2) | styrene, 1,3-butadiene | Modifier (2) | 30 | 56 | 1.19 | 25.0 |
| Copolymer (11) | Initiator (2) | styrene, 1,3-butadiene, Modifier (1) | Not added | 30 | 56 | 1.25 | 25.4 |
| Copolymer (12) | n-butyllithium solution | styrene, 1,3-butadiene | Not added | 30 | 56 | 1.09 | 26.5 |
| Copolymer (13) | Initiator (1) | styrene, 1,3-butadiene, Modifier (3) | Modifier (2) | 30 | 57 | 1.19 | 25.2 |
| Copolymer (14) | Initiator (1) | styrene, 1,3-butadiene | Not added | 30 | 57 | 1.16 | 26.1 |
| Copolymer (15) | n-butyllithium solution | styrene, 1,3-butadiene, Modifier (3) | Not added | 30 | 56 | 1.13 | 27.9 |
| Copolymer (16) | n-butyllithium solution | styrene, 1,3-butadiene | Modifier (2) | 30 | 55 | 1.10 | 27.4 |
| Copolymer (17) | Initiator (4) | styrene, 1,3-butadiene, Modifier (1) | Modifier (2) | 30 | 55 | 1.29 | 28.9 |

TABLE 2

Examples in which a compound represented by the formula (IV) is used as a chain-end modifier

| Copolymer | Initiator | Monomer component | Chain-end modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (18) | Initiator (2) | styrene, 1,3-butadiene, Modifier (1) | Modifier (4) | 30 | 57 | 1.26 | 28.3 |
| Copolymer (19) | Initiator (3) | styrene, 1,3-butadiene, Modifier (1) | Modifier (4) | 30 | 57 | 1.28 | 28.0 |
| Copolymer (20) | Initiator (2) | styrene, 1,3-butadiene, Modifier (1) | Modifier (4) | 45 | 56 | 1.25 | 29.2 |
| Copolymer (21) | Initiator (1) | styrene, 1,3-butadiene, Modifier (1) | Modifier (4) | 30 | 56 | 1.19 | 27.2 |
| Copolymer (22) | Initiator (1) | styrene, 1,3-butadiene, Modifier (1) | Modifier (4) | 30 | 57 | 1.17 | 26.1 |
| Copolymer (23) | Initiator (1) | 1,3-butadiene, Modifier (1) | Modifier (4) | 0 | 13.9 | 1.17 | 25.9 |
| Copolymer (24) | Initiator (1) | styrene, 1,3-butadiene, Modifier (3) | Modifier (4) | 30 | 56 | 1.20 | 25.8 |
| Copolymer (25) | Initiator (1) | styrene, 1,3-butadiene, Modifier (3) | Modifier (4) | 30 | 58 | 1.18 | 26.2 |
| Copolymer (26) | n-butyllithium solution | styrene, 1,3-butadiene | Modifier (4) | 30 | 56 | 1.14 | 27.1 |

TABLE 3

Examples in which a compound represented by the formula (IIIb) is used as a chain-end modifier

| Copolymer | Initiator | Monomer component | Chain-end modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (27) | Initiator (2) | styrene, 1,3-butadiene, Modifier (1) | Modifier (5) | 30 | 57 | 1.18 | 27.1 |
| Copolymer (28) | Initiator (3) | styrene, 1,3-butadiene, Modifier (1) | Modifier (5) | 30 | 56 | 1.16 | 26.3 |
| Copolymer (29) | Initiator (2) | styrene, 1,3-butadiene, Modifier (1) | Modifier (5) | 45 | 56 | 1.16 | 24.6 |
| Copolymer (30) | Initiator (1) | styrene, 1,3-butadiene, Modifier (1) | Modifier (5) | 30 | 57 | 1.12 | 24.9 |
| Copolymer (31) | Initiator (1) | styrene, 1,3-butadiene, Modifier (1) | Modifier (5) | 30 | 56 | 1.13 | 26.7 |
| Copolymer (32) | Initiator (1) | 1,3-butadiene, Modifier (1) | Modifier (5) | 0 | 14.0 | 1.17 | 26.6 |
| Copolymer (33) | Initiator (1) | styrene, 1,3-butadiene, Modifier (3) | Modifier (5) | 30 | 56 | 1.13 | 25.6 |
| Copolymer (34) | Initiator (1) | styrene, 1,3-butadiene, Modifier (3) | Modifier (5) | 30 | 56 | 1.10 | 25.5 |
| Copolymer (35) | Initiator (1) | styrene, 1,3-butadiene, Modifier (3) | Modifier (6) | 30 | 57 | 1.14 | 25.2 |

TABLE 3-continued

Examples in which a compound represented by the formula (IIIb) is used as a chain-end modifier

| Copolymer | Initiator | Monomer component | Chain-end modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (36) | Initiator (1) | styrene, 1,3-butadiene, Modifier (3) | Modifier (7) | 30 | 56 | 1.15 | 25.9 |
| Copolymer (37) | n-butyllithium solution | styrene, 1,3-butadiene | Modifier (5) | 30 | 55 | 1.09 | 26.3 |

TABLE 4

Examples in which a compound containing an alkoxysilyl group, a nitrogen atom and a carbonyl group is used as a chain-end modifier

| Copolymer | Initiator | Monomer component | Chain-end modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (38) | Initiator (2) | styrene, 1,3-butadiene, Modifier (1) | Modifier (8) | 30 | 56 | 1.24 | 27.5 |
| Copolymer (39) | Initiator (3) | styrene, 1,3-butadiene, Modifier (1) | Modifier (8) | 30 | 56 | 1.22 | 28.3 |
| Copolymer (40) | Initiator (2) | styrene, 1,3-butadiene, Modifier (1) | Modifier (8) | 45 | 57 | 1.23 | 27.8 |
| Copolymer (41) | Initiator (1) | styrene, 1,3-butadiene, Modifier (1) | Modifier (8) | 30 | 56 | 1.20 | 28.5 |
| Copolymer (42) | Initiator (1) | styrene, 1,3-butadiene, Modifier (1) | Modifier (8) | 30 | 55 | 1.19 | 28.6 |
| Copolymer (43) | Initiator (1) | 1,3-butadiene, Modifier (1) | Modifier (8) | 0 | 14.4 | 1.21 | 28.4 |
| Copolymer (44) | Initiator (1) | styrene, 1,3-butadiene, Modifier (3) | Modifier (8) | 30 | 56 | 1.22 | 28.3 |
| Copolymer (45) | Initiator (1) | styrene, 1,3-butadiene, Modifier (3) | Modifier (8) | 30 | 57 | 1.18 | 28.0 |
| Copolymer (46) | n-butyllithium solution | styrene, 1,3-butadiene | Modifier (8) | 30 | 56 | 1.16 | 27.3 |

TABLE 5

Examples in which an N,N-dialkyl-substituted carboxylic acid amide dialkyl acetal compound is used as a chain-end modifier

| Copolymer | Initiator | Monomer component | Chain-end modifier | Styrene content (% by mass) | Vinyl content (mol %) | Molecular weight distribution Mw/Mn | Molecular weight Mw (unit: ten thousand) |
|---|---|---|---|---|---|---|---|
| Copolymer (47) | Initiator (2) | styrene, 1,3-butadiene, Modifier (1) | Modifier (9) | 30 | 57 | 1.20 | 27.2 |
| Copolymer (48) | Initiator (3) | styrene, 1,3-butadiene, Modifier (1) | Modifier (9) | 30 | 56 | 1.21 | 27.3 |
| Copolymer (49) | Initiator (2) | styrene, 1,3-butadiene, Modifier (1) | Modifier (9) | 45 | 55 | 1.21 | 27.8 |
| Copolymer (50) | Initiator (1) | styrene, 1,3-butadiene, Modifier (1) | Modifier (9) | 30 | 56 | 1.20 | 27.6 |
| Copolymer (51) | Initiator (1) | styrene, 1,3-butadiene, Modifier (1) | Modifier (9) | 30 | 56 | 1.19 | 26.9 |
| Copolymer (52) | Initiator (1) | 1,3-butadiene, Modifier (1) | Modifier (9) | 0 | 14.3 | 1.20 | 27.9 |
| Copolymer (53) | Initiator (1) | styrene, 1,3-butadiene, Modifier (3) | Modifier (9) | 30 | 57 | 1.18 | 26.8 |
| Copolymer (54) | Initiator (1) | styrene, 1,3-butadiene, Modifier (3) | Modifier (9) | 30 | 56 | 1.20 | 28.1 |
| Copolymer (55) | n-butyllithium solution | styrene, 1,3-butadiene | Modifier (9) | 30 | 57 | 1.17 | 27.1 |

The following describes the various chemicals used in the examples and comparative examples.
Copolymers (1) to (55): synthesized as above
Butadiene rubber: Ubepol BR150B from Ube Industries, Ltd.
Silica: Ultrasil VN3-G ($N_2SA$: 175 $m^2/g$) from Evonik Degussa
Silane coupling agent: Si69 (bis(3-triethoxysilylpropyl)tetrasulfide) from Evonik Degussa
Carbon black: Diablack N339 ($N_2SA$: 96 $m^2/g$, DBP absorption: 124 mL/100 g) from Mitsubishi Chemical Corporation
Oil: X-140 from JX Nippon Oil & Energy Corporation
Antioxidant: Antigene 3C from Sumitomo Chemical Co., Ltd.
Stearic acid: TSUBAKI stearic acid beads from NOF Corporation
Zinc oxide: Zinc oxide #1 from Mitsui Mining & Smelting Co., Ltd.
Wax: Sannoc N from Ouchi Shinko Chemical Industrial Co., Ltd.
Sulfur: sulfur powder from Tsurumi Chemical Industry Co., Ltd.
Vulcanization accelerator 1: Soxinol CZ from Sumitomo Chemical Co., Ltd.
Vulcanization accelerator 2: Soxinol D from Sumitomo Chemical Co., Ltd.

Examples and Comparative Examples

According to each of the formulations shown in Tables 6 to 12, the materials other than the sulfur and vulcanization accelerators were kneaded for 5 minutes at 150° C. using a 1.7-L Banbury mixer from Kobe Steel, Ltd. to give a kneadate. The sulfur and vulcanization accelerators were then added to the kneadate, followed by kneading for 5 minutes at 80° C. using an open roll mill to give an unvulcanized rubber composition. The unvulcanized rubber composition was press-vulcanized for 20 minutes at 170° C. in a 0.5 mm-thick mold to obtain a vulcanized rubber composition.

In addition, the unvulcanized rubber composition was formed into a tread shape and assembled with other tire components on a tire building machine to form an unvulcanized tire. The unvulcanized tire was vulcanized for 12 minutes at 170° C. to prepare a test tire (size: 195/65R15).

<Evaluation Items and Test Methods>
<tan δ>

The tan δ of each vulcanized rubber composition was measured at a temperature of 50° C., a dynamic strain amplitude of 1%, and a frequency of 10 Hz using a spectrometer from Ueshima Seisakusho Co., Ltd. The reciprocal value of the tan δ is expressed as an index relative to that of Comparative Example 4 (=100). A larger value indicates a smaller rolling resistance, which in turn indicates better fuel economy.

<Rolling Resistance>

The rolling resistance was measured using a rolling resistance tester by running each test tire mounted on a 15×6JJ rim at an internal pressure of 230 kPa, a load of 3.43 kN, and a speed of 80 km/h. The result is expressed as an index relative to that of Comparative Example 4 (=100). A larger value indicates a smaller rolling resistance, which in turn indicates better fuel economy.

<Wet-Grip Performance>

The test tires of each example were mounted on all the wheels of a vehicle (domestic front-engine, front-wheel drive (FF) vehicle, 2000 cc). The braking distance from an initial speed of 100 km/h was determined on a wet asphalt road surface. The result is expressed as an index. A larger value indicates better wet-skid performance (wet-grip performance). The index was calculated based on the following equation.

(Wet-grip performance index)=(Braking distance in Comparative Example 4)/(Braking distance of each formulation)×100

(LAT Abrasion Test)

The volume loss of each vulcanized rubber composition was measured using a LAT tester (Laboratory Abrasion and Skid Tester) at a load of 50 N, a speed of 20 km/h, and a slip angle of 5°. The values (abrasion resistance indices) in Tables 6 to 12 are relative values with respect to the volume loss of Comparative Example 4 taken as 100. A larger value indicates better abrasion resistance.

<Mooney Viscosity>

The Mooney viscosity ($ML_{1+4}$/130° C.) of each unvulcanized rubber composition was determined in accordance with JIS K6300-1:2001 "Rubber, unvulcanized—Physical property—Part 1: Determination of Mooney viscosity and pre-vulcanization characteristics with Mooney viscometer" using a Mooney viscosity tester. That is, under a temperature condition of 130° C. achieved by 1 minute pre-heating, a small rotor was rotated for 4 minutes, and then the Mooney viscosity of the unvulcanized rubber composition was measured. The result is expressed as an index. A larger value indicates a lower Mooney viscosity, which in turn indicates better processability. The index was calculated based on the following equation.

(Mooney viscosity index)=(Mooney viscosity of Comparative Example 4)/(Mooney viscosity of each formulation)×100

TABLE 6

Examples in which a compound represented by the formula (IIId) is used as a chain-end modifier (modified SBR)

| | | Example | | | | | | | Comparative Example | | | | | | | | |
|---|---|---|---|---|---|---|---|---|---|---|---|---|---|---|---|---|---|
| | | 1 | 2 | 3 | 4 | 5 | 6 | 7 | 1 | 2 | 3 | 4 | 5 | 6 | 7 | 8 | 9 |
| Formulation (part(s) by mass) | Copolymer (1) | 70 | — | — | — | — | — | — | — | — | — | — | — | — | — | — | 100 |
| | Copolymer (2) | — | 70 | — | — | — | — | — | — | — | — | — | — | — | — | — | — |
| | Copolymer (3) | — | — | 70 | — | — | — | — | — | — | — | — | — | — | — | — | — |
| | Copolymer (4) | — | — | — | 70 | — | — | — | — | — | — | — | — | — | — | — | — |
| | Copolymer (5) | — | — | — | — | 70 | — | — | — | — | — | — | — | — | — | — | — |
| | Copolymer (7) | — | — | — | — | — | 70 | — | — | — | — | — | — | — | — | — | — |
| | Copolymer (8) | — | — | — | — | — | — | — | 70 | — | — | — | — | — | — | — | — |
| | Copolymer (10) | — | — | — | — | — | — | — | — | 70 | — | — | — | — | — | — | — |
| | Copolymer (11) | — | — | — | — | — | — | — | — | — | 70 | — | — | — | — | — | — |
| | Copolymer (12) | — | — | — | — | — | — | — | — | — | — | 70 | — | — | — | — | — |
| | Copolymer (13) | — | — | — | — | — | — | 70 | — | — | — | — | — | — | — | — | — |
| | Copolymer (14) | — | — | — | — | — | — | — | — | — | — | — | 70 | — | — | — | — |
| | Copolymer (15) | — | — | — | — | — | — | — | — | — | — | — | — | 70 | — | — | — |
| | Copolymer (16) | — | — | — | — | — | — | — | — | — | — | — | — | — | 70 | — | — |
| | Copolymer (17) | — | — | — | — | — | — | — | — | — | — | — | — | — | — | 70 | — |
| | Butadiene rubber | 30 | 30 | 30 | 30 | 30 | 30 | 30 | 30 | 30 | 30 | 30 | 30 | 30 | 30 | 30 | — |
| | Silica | 75 | 75 | 75 | 50 | 75 | 75 | 75 | 75 | 75 | 75 | 75 | 75 | 75 | 75 | 75 | 75 |
| | Silane coupling agent | 6 | 6 | 6 | 4 | 6 | 6 | 6 | 6 | 6 | 6 | 6 | 6 | 6 | 6 | 6 | 6 |
| | Carbon black | 5 | 5 | 5 | 5 | 5 | 5 | 5 | 5 | 5 | 5 | 5 | 5 | 5 | 5 | 5 | 5 |
| | Oil | 20 | 20 | 20 | 5 | 20 | 20 | 20 | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Evaluation | tan δ index | 131 | 133 | 132 | 145 | 142 | 144 | 114 | 106 | 103 | 106 | 100 | 107 | 106 | 105 | 109 | 102 |
| | Rolling resistance index | 126 | 124 | 130 | 127 | 129 | 128 | 111 | 102 | 102 | 104 | 100 | 104 | 102 | 101 | 103 | 98 |
| | Wet-grip performance index | 113 | 113 | 112 | 111 | 111 | 114 | 109 | 103 | 105 | 105 | 100 | 100 | 101 | 100 | 104 | 102 |

TABLE 6-continued

Examples in which a compound represented by the formula (IIId) is used as a chain-end modifier (modified SBR)

|  |  | Example |  |  |  |  |  |  | Comparative Example |  |  |  |  |  |  |  |
|---|---|---|---|---|---|---|---|---|---|---|---|---|---|---|---|---|
|  |  | 1 | 2 | 3 | 4 | 5 | 6 | 7 | 1 | 2 | 3 | 4 | 5 | 6 | 7 | 8 | 9 |
|  | Abrasion resistance index | 104 | 105 | 104 | 102 | 103 | 105 | 104 | 102 | 104 | 102 | 100 | 96 | 95 | 99 | 91 | 83 |
|  | Mooney viscosity index | 106 | 107 | 104 | 112 | 102 | 103 | 107 | 102 | 105 | 101 | 100 | 99 | 97 | 96 | 96 | 97 |

TABLE 7

Examples in which a compound represented by the formula (IV) is used as a chain-end modifier (modified SBR)

|  |  | Example |  |  |  |  |  |  | Comparative Example |  |  |  |  |
|---|---|---|---|---|---|---|---|---|---|---|---|---|---|
|  |  | 8 | 9 | 10 | 11 | 12 | 13 | 14 | 4 | 5 | 6 | 10 | 11 |
| Formulation (part(s) by mass) | Copolymer (18) | 70 | — | — | — | — | — | — | — | — | — | — | 100 |
|  | Copolymer (19) | — | 70 | — | — | — | — | — | — | — | — | — | — |
|  | Copolymer (20) | — | — | 70 | — | — | — | — | — | — | — | — | — |
|  | Copolymer (21) | — | — | — | 70 | — | — | — | — | — | — | — | — |
|  | Copolymer (22) | — | — | — | — | 70 | — | — | — | — | — | — | — |
|  | Copolymer (24) | — | — | — | — | — | 70 | — | — | — | — | — | — |
|  | Copolymer (25) | — | — | — | — | — | — | 70 | — | — | — | — | — |
|  | Copolymer (12) | — | — | — | — | — | — | — | 70 | — | — | — | — |
|  | Copolymer (14) | — | — | — | — | — | — | — | — | 70 | — | — | — |
|  | Copolymer (15) | — | — | — | — | — | — | — | — | — | 70 | — | — |
|  | Copolymer (26) | — | — | — | — | — | — | — | — | — | — | 70 | — |
|  | Butadiene rubber | 30 | 30 | 30 | 30 | 30 | 30 | 30 | 30 | 30 | 30 | 30 | — |
|  | Silica | 75 | 75 | 75 | 50 | 75 | 75 | 75 | 75 | 75 | 75 | 75 | 75 |
|  | Silane coupling agent | 6 | 6 | 6 | 4 | 6 | 6 | 6 | 6 | 6 | 6 | 6 | 6 |
|  | Carbon black | 5 | 5 | 5 | 5 | 5 | 5 | 5 | 5 | 5 | 5 | 5 | 5 |
|  | Oil | 20 | 20 | 20 | 5 | 20 | 20 | 20 | 20 | 20 | 20 | 20 | 20 |
|  | Antioxidant | 1.5 | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 | 1.2 | 1.2 |
| Evaluation | tan δ index | 129 | 126 | 127 | 126 | 122 | 123 | 113 | 100 | 107 | 106 | 108 | 107 |
|  | Rolling resistance index | 112 | 108 | 118 | 110 | 109 | 111 | 108 | 100 | 104 | 102 | 101 | 102 |
|  | Wet-grip performance index | 110 | 109 | 108 | 111 | 112 | 110 | 109 | 100 | 100 | 101 | 100 | 102 |
|  | Abrasion resistance index | 109 | 106 | 110 | 109 | 107 | 108 | 110 | 100 | 96 | 95 | 96 | 82 |
|  | Mooney viscosity index | 103 | 104 | 107 | 103 | 109 | 110 | 106 | 100 | 99 | 97 | 99 | 95 |

TABLE 8

(Modified SBR)

|  |  | Example |  | Comparative Example |  |
|---|---|---|---|---|---|
|  |  | 15 | 16 | 4 | 12 |
| Formulation (part(s) by mass) | Copolymer (12) | 70 | 70 | 70 | 70 |
|  | Copolymer (6) | 30 | — | — | — |
|  | Copolymer (23) | — | 30 | — | — |
|  | Copolymer (9) | — | — | — | 30 |
|  | Butadiene rubber | — | — | 30 | — |
|  | Silica | 75 | 75 | 75 | 75 |
|  | Silane coupling agent | 6 | 6 | 6 | 6 |
|  | Carbon black | 5 | 5 | 5 | 5 |
|  | Oil | 20 | 20 | 20 | 20 |
|  | Antioxidant | 1.5 | 1.5 | 1.5 | 1.5 |
|  | Stearic acid | 2 | 2 | 2 | 2 |
|  | Zinc oxide | 2.5 | 2.5 | 2.5 | 2.5 |
|  | Wax | 1 | 1 | 1 | 1 |
|  | Sulfur | 2 | 2 | 2 | 2 |
|  | Vulcanization accelerator 1 | 1.8 | 1.8 | 1.8 | 1.8 |
|  | Vulcanization accelerator 2 | 1.2 | 1.2 | 1.2 | 1.2 |
| Evaluation | tan δ index | 126 | 123 | 100 | 110 |
|  | Rolling resistance index | 112 | 110 | 100 | 103 |
|  | Wet-grip performance index | 111 | 109 | 100 | 102 |
|  | Abrasion resistance index | 99 | 101 | 100 | 95 |
|  | Mooney viscosity index | 109 | 100 | 100 | 101 |

TABLE 9

Examples in which a compound represented by the formula (IIIb) is used as a chain-end modifier (modified SBR)

| | | Example | | | | | | | | | Comparative Example | | | | |
|---|---|---|---|---|---|---|---|---|---|---|---|---|---|---|---|
| | | 17 | 18 | 19 | 20 | 21 | 22 | 23 | 24 | 25 | 4 | 5 | 6 | 13 | 14 |
| Formulation (part(s) by mass) | Copolymer (27) | 70 | — | — | — | — | — | — | — | — | — | — | — | — | — |
| | Copolymer (28) | — | 70 | — | — | — | — | — | — | — | — | — | — | — | — |
| | Copolymer (29) | — | — | 70 | — | — | — | — | — | — | — | — | — | — | — |
| | Copolymer (30) | — | — | — | 70 | — | — | — | — | — | — | — | — | — | — |
| | Copolymer (31) | — | — | — | — | 70 | — | — | — | — | — | — | — | — | — |
| | Copolymer (33) | — | — | — | — | — | 70 | — | — | — | — | — | — | — | — |
| | Copolymer (34) | — | — | — | — | — | — | 70 | — | — | — | — | — | — | — |
| | Copolymer (35) | — | — | — | — | — | — | — | 70 | — | — | — | — | — | — |
| | Copolymer (36) | — | — | — | — | — | — | — | — | 70 | — | — | — | — | — |
| | Copolymer (12) | — | — | — | — | — | — | — | — | — | 70 | — | — | — | — |
| | Copolymer (14) | — | — | — | — | — | — | — | — | — | — | 70 | — | — | — |
| | Copolymer (15) | — | — | — | — | — | — | — | — | — | — | — | 70 | — | — |
| | Copolymer (37) | — | — | — | — | — | — | — | — | — | — | — | — | 70 | — |
| | Butadiene rubber | 30 | 30 | 30 | 30 | 30 | 30 | 30 | 30 | 30 | 30 | 30 | 30 | 30 | — |
| | Silica | 75 | 75 | 75 | 50 | 75 | 75 | 75 | 75 | 75 | 75 | 75 | 75 | 75 | 75 |
| | Silane coupling agent | 6 | 6 | 6 | 4 | 6 | 6 | 6 | 6 | 6 | 6 | 6 | 6 | 6 | 6 |
| | Carbon black | 5 | 5 | 5 | 5 | 5 | 5 | 5 | 5 | 5 | 5 | 5 | 5 | 5 | 5 |
| | Oil | 20 | 20 | 20 | 5 | 20 | 20 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Evaluation | tan δ index | 123 | 119 | 120 | 113 | 123 | 123 | 110 | 120 | 106 | 100 | 107 | 106 | 104 | 108 |
| | Rolling resistance index | 119 | 123 | 109 | 107 | 108 | 110 | 109 | 110 | 103 | 100 | 104 | 102 | 103 | 101 |
| | Wet-grip performance index | 104 | 104 | 103 | 113 | 103 | 102 | 112 | 106 | 109 | 100 | 100 | 101 | 108 | 106 |
| | Abrasion resistance index | 102 | 103 | 110 | 105 | 107 | 104 | 103 | 105 | 107 | 100 | 96 | 95 | 97 | 87 |
| | Mooney viscosity index | 102 | 107 | 103 | 102 | 103 | 101 | 107 | 102 | 103 | 100 | 99 | 97 | 101 | 97 |

TABLE 10

Examples in which a compound containing an alkoxysilyl group, a nitrogen atom and a carbonyl group is used as a chain-end modifier (modified SBR)

| | | Example | | | | | | | Comparative Example | | | | |
|---|---|---|---|---|---|---|---|---|---|---|---|---|---|
| | | 26 | 27 | 28 | 29 | 30 | 31 | 32 | 4 | 5 | 6 | 15 | 16 |
| Formulation (part(s) by mass) | Copolymer (38) | 70 | — | — | — | — | — | — | — | — | — | — | — |
| | Copolymer (39) | — | 70 | — | — | — | — | — | — | — | — | — | — |
| | Copolymer (40) | — | — | 70 | — | — | — | — | — | — | — | — | — |
| | Copolymer (41) | — | — | — | 70 | — | — | — | — | — | — | — | — |
| | Copolymer (42) | — | — | — | — | 70 | — | — | — | — | — | — | — |
| | Copolymer (44) | — | — | — | — | — | 70 | — | — | — | — | — | — |
| | Copolymer (45) | — | — | — | — | — | — | 70 | — | — | — | — | — |
| | Copolymer (12) | — | — | — | — | — | — | — | 70 | — | — | — | — |
| | Copolymer (14) | — | — | — | — | — | — | — | — | 70 | — | — | — |
| | Copolymer (15) | — | — | — | — | — | — | — | — | — | 70 | — | — |
| | Copolymer (46) | — | — | — | — | — | — | — | — | — | — | 70 | — |
| | Butadiene rubber | 30 | 30 | 30 | 30 | 30 | 30 | 30 | 30 | 30 | 30 | 30 | — |
| | Silica | 75 | 75 | 75 | 50 | 75 | 75 | 75 | 75 | 75 | 75 | 75 | 75 |
| | Silane coupling agent | 6 | 6 | 6 | 4 | 6 | 6 | 6 | 6 | 6 | 6 | 6 | 6 |
| | Carbon black | 5 | 5 | 5 | 5 | 5 | 5 | 5 | 5 | 5 | 5 | 5 | 5 |
| | Oil | 20 | 20 | 20 | 5 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 |
| Evaluation | tan δ index | 118 | 110 | 117 | 114 | 118 | 114 | 109 | 100 | 107 | 106 | 103 | 104 |
| | Rolling resistance index | 105 | 103 | 106 | 106 | 107 | 104 | 104 | 100 | 104 | 102 | 105 | 101 |
| | Wet-grip performance index | 103 | 109 | 107 | 110 | 111 | 109 | 111 | 100 | 100 | 101 | 100 | 98 |
| | Abrasion resistance index | 107 | 106 | 102 | 103 | 104 | 102 | 103 | 100 | 96 | 95 | 97 | 88 |
| | Mooney viscosity index | 106 | 105 | 103 | 102 | 100 | 104 | 105 | 100 | 99 | 97 | 95 | 94 |

TABLE 11

Examples in which an N,N-dialkyl-substituted carboxylic acid amide dialkyl acetal compound is used as a chain-end modifier (modified SBR)

| | | Example | | | | | | | Comparative Example | | | | |
|---|---|---|---|---|---|---|---|---|---|---|---|---|---|
| | | 33 | 34 | 35 | 36 | 37 | 38 | 39 | 4 | 5 | 6 | 17 | 18 |
| Formulation (part(s) by mass) | Copolymer (47) | 70 | — | — | — | — | — | — | — | — | — | — | — |
| | Copolymer (48) | — | 70 | — | — | — | — | — | — | — | — | — | — |
| | Copolymer (49) | — | — | 70 | — | — | — | — | — | — | — | — | — |
| | Copolymer (50) | — | — | — | 70 | — | — | — | — | — | — | — | — |
| | Copolymer (51) | — | — | — | — | 70 | — | — | — | — | — | — | — |
| | Copolymer (53) | — | — | — | — | — | 70 | — | — | — | — | — | — |
| | Copolymer (54) | — | — | — | — | — | — | 70 | — | — | — | — | — |
| | Copolymer (12) | — | — | — | — | — | — | — | 70 | — | — | — | — |
| | Copolymer (14) | — | — | — | — | — | — | — | — | 70 | — | — | — |
| | Copolymer (15) | — | — | — | — | — | — | — | — | — | 70 | — | — |
| | Copolymer (55) | — | — | — | — | — | — | — | — | — | — | 70 | — |
| | Copolymer (17) | — | — | — | — | — | — | — | — | — | — | — | 100 |
| | Butadiene rubber | 30 | 30 | 30 | 30 | 30 | 30 | 30 | 30 | 30 | 30 | 30 | — |
| | Silica | 75 | 75 | 75 | 50 | 75 | 75 | 75 | 75 | 75 | 75 | 75 | 75 |
| | Silane coupling agent | 6 | 6 | 6 | 4 | 6 | 6 | 6 | 6 | 6 | 6 | 6 | 6 |
| | Carbon black | 5 | 5 | 5 | 5 | 5 | 5 | 5 | 5 | 5 | 5 | 5 | 5 |
| | Oil | 20 | 20 | 20 | 5 | 20 | 20 | 20 | 20 | 20 | 20 | 20 | 20 |
| | Antioxidant | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 |
| Evaluation | tan δ index | 119 | 112 | 110 | 116 | 115 | 113 | 107 | 100 | 107 | 106 | 104 | 104 |
| | Rolling resistance index | 105 | 105 | 104 | 105 | 108 | 102 | 103 | 100 | 104 | 102 | 104 | 102 |
| | Wet-grip performance index | 102 | 107 | 111 | 108 | 113 | 108 | 110 | 100 | 100 | 101 | 99 | 97 |
| | Abrasion resistance index | 108 | 107 | 103 | 102 | 103 | 102 | 102 | 100 | 96 | 95 | 98 | 87 |
| | Mooney viscosity index | 103 | 105 | 104 | 104 | 100 | 103 | 106 | 100 | 99 | 97 | 94 | 93 |

TABLE 12

(Modified BR)

| | | Example | | | Comparative Example 4 |
|---|---|---|---|---|---|
| | | 40 | 41 | 42 | |
| Formulation (parts(s) by mass) | Copolymer (12) | 70 | 70 | 70 | 70 |
| | Copolymer (32) | 30 | — | — | — |
| | Copolymer (43) | — | 30 | — | — |
| | Copolymer (52) | — | — | 30 | — |
| | Butadiene rubber | — | — | — | 30 |
| | Silica | 75 | 75 | 75 | 75 |
| | Silane coupling agent | 6 | 6 | 6 | 6 |
| | Carbon black | 5 | 5 | 5 | 5 |
| | Oil | 20 | 20 | 20 | 20 |
| | Antioxidant | 1.5 | 1.5 | 1.5 | 1.5 |
| | Stearic acid | 2 | 2 | 2 | 2 |
| | Zinc oxide | 2.5 | 2.5 | 2.5 | 2.5 |
| | Wax | 1 | 1 | 1 | 1 |
| | Sulfur | 2 | 2 | 2 | 2 |
| | Vulcanization accelerator 1 | 1.8 | 1.8 | 1.8 | 1.8 |
| | Vulcanization accelerator 2 | 1.2 | 1.2 | 1.2 | 1.2 |
| Evaluation | tan δ index | 118 | 119 | 119 | 100 |
| | Rolling resistance index | 109 | 112 | 112 | 100 |
| | Wet-grip performance index | 108 | 106 | 106 | 100 |
| | Abrasion resistance index | 100 | 99 | 99 | 100 |
| | Mooney viscosity index | 99 | 102 | 102 | 100 |

As shown in Tables 6 to 12, since the rubber compositions of the examples each contain a specified amount of silica and a specified amount of a diene copolymer that has a specific amine structure at an initiation end, a structural unit derived from a silicon-containing compound at a main chain, and a structural unit derived from a compound containing a nitrogen atom and/or a silicon atom at a termination end, the rubber compositions exhibited balanced improvements in fuel economy, wet-grip performance, abrasion resistance, and processability, as compared to the rubber compositions of the comparative examples. Moreover, comparison between the conjugated diene polymer in which the three portions: the initiation end, the main chain, and the termination end are modified by specific compounds and a copolymer in which only one of the initiation end, main chain and termination end is modified shows that modification of the three portions (the initiation end, the main chain, and the termination end) synergistically increases the effects of improving those properties.

The rubber composition of Comparative Example 8 contains, instead of the conjugated diene polymer, the copolymer (17) which has a structural unit derived from a silicon-containing compound at a main chain and a structural unit derived from a compound containing a nitrogen atom and/or a silicon atom at a termination end but does not have a specific amine structure at an initiation end. The rubber composition of Comparative Example 8 has lower performance than that in the examples, and in particular has inferior abrasion resistance and processability as compared to those of Comparative Example 4 taken as a reference.

The rubber compositions of Comparative Examples 9, 11, 14, 16, and 18 each contain too large an amount of the conjugated diene polymer. Thus, the abrasion resistance was reduced greatly, and other properties were equal to or lower than those in the other comparative examples.

The invention claimed is:

1. A rubber composition, comprising
silica and
a conjugated diene polymer, the conjugated diene polymer being obtained by reacting a compound containing at least one of a nitrogen atom and a silicon with an active terminal of the copolymer, wherein the compound containing at least one of a nitrogen atom and a silicon atom is at least one compound selected from the group consisting of
(i) a compound of formula (IIIb):

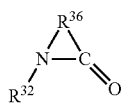
(IIIb)

wherein $R^{32}$ represents a hydrocarbyl group and $R^{36}$ represents a hydrocarbylene group or a group in which a hydrocarbylene group and a group represented by —$NR^{35}$— are bonded, where $R^{35}$ represents a hydrocarbyl group or a hydrogen atom, (ii) a compound of formula (IIId):

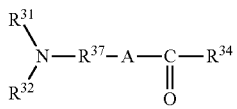
(IIId)

wherein $R^{31}$ and $R^{32}$ each represents a hydrocarbyl group, $R^{37}$ represents a hydrocarbylene group, A represents an oxygen atom or —$NR^{35}$— wherein $R^{35}$ represents a hydrocarbyl group or a hydrogen atom, and $R^{34}$ represents a hydrocarbyl group or a hydrogen atom, (iii) a compound of formula (IV):

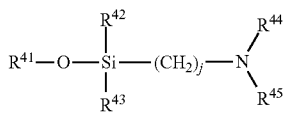
(IV)

wherein $R^{41}$ represents a hydrocarbyl group, $R^{42}$ and $R^{43}$ each represents a hydrocarbyl group or a hydrocarbyloxy group, $R^{44}$ and $R^{45}$ each represents a hydrocarbyl group, and j represents an integer of 1 to 5, (iv) a tris[(alkoxysilyl)alkyl]isocyanurate compound, and (v) an N,N-dialkyl-substituted carboxylic acid amide dialkyl acetal compound, wherein said copolymer is obtained by polymerizing a monomer component including a conjugated diene compound and a silicon-containing vinyl compound using a polymerization initiator represented by the following formula (I):

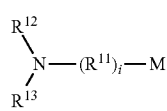
(I)

wherein i represents 0 or 1; $R^{11}$ represents a $C_{7-80}$ hydrocarbylene group; $R^{12}$ and $R^{13}$ each represent a hydrocarbyl group, or $R^{12}$ and $R^{13}$ can be joined together to represent a hydrocarbylene group; and M represents an alkali metal atom,
wherein the silicon-containing vinyl compound is represented by the formula

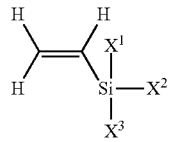

wherein $X^1$, $X^2$, and $X^3$ each represents a hydrocarbyl group or a group of the formula —$NR^{22}R^{23}$ wherein $R^{22}$ and $R^{23}$ are each an alkyl group, provided that at least one of $X^1$, $X^2$, and $X^3$ is a group of the formula —$NR^{22}R^{23}$,
wherein an amount of the conjugated diene polymer is 25 to 80% by mass based on 100% by mass of a rubber component of the rubber composition, and
an amount of the silica is 10 to 150 parts by mass per 100 parts by mass of the rubber component.

2. The rubber composition according to claim 1, wherein $R^{11}$ in the formula (I) is a group represented by the following formula (Ia):

$$-(CH_2)_n-R^{14}- \quad \text{(Ia)}$$

wherein $R^{14}$ represents a hydrocarbylene group comprising at least one of a conjugated diene compound-derived structural unit and an aromatic vinyl compound-derived structural unit; and n represents an integer of 1 to 10.

3. The rubber composition according to claim 2, wherein $R^{14}$ in the formula (Ia) is a hydrocarbylene group having one to ten isoprene-derived structural units.

4. The rubber composition according to claim 1, wherein the conjugated diene polymer comprises an aromatic vinyl compound-derived structural unit.

5. The rubber composition according to claim 1, wherein the silica has a nitrogen adsorption specific surface area of 40 to 400 $m^2/g$.

6. A pneumatic tire, formed from the rubber composition according to claim 1.

* * * * *